(12) United States Patent
Nakajima et al.

(10) Patent No.: US 11,254,246 B2
(45) Date of Patent: Feb. 22, 2022

(54) DECORATIVE SHEET

(71) Applicant: SEIREN CO., LTD., Fukui (JP)

(72) Inventors: Shigeru Nakajima, Fukui (JP); Nobuyuki Aoki, Fukui (JP)

(73) Assignee: SEIREN CO., LTD.

( * ) Notice: Subject to any disclaimer, the term of this patent is extended or adjusted under 35 U.S.C. 154(b) by 0 days.

(21) Appl. No.: 16/807,609

(22) Filed: Mar. 3, 2020

(65) Prior Publication Data
US 2020/0282884 A1 Sep. 10, 2020

(30) Foreign Application Priority Data
Mar. 4, 2019 (JP) .............................. JP2019-039084

(51) Int. Cl.
  *B60N 2/58* (2006.01)
  *B29C 59/04* (2006.01)
  *B32B 3/30* (2006.01)
  *B44B 5/00* (2006.01)
  *B44B 5/02* (2006.01)
  *B29L 7/00* (2006.01)

(52) U.S. Cl.
CPC ............... *B60N 2/58* (2013.01); *B29C 59/04* (2013.01); *B32B 3/30* (2013.01); *B29L 2007/002* (2013.01); *B32B 2451/00* (2013.01); *B44B 5/0047* (2013.01); *B44B 5/024* (2013.01); *B44B 5/028* (2013.01); *Y10T 428/2457* (2015.01)

(58) Field of Classification Search
CPC . B32B 3/30; B32B 2451/00; B29L 2007/002; Y10T 428/2457
See application file for complete search history.

(56) References Cited

U.S. PATENT DOCUMENTS 5,487,962 A * 1/1996 Rolfson .................... G03F 1/28
  430/312
6,475,704 B1 * 11/2002 Iwasaki ..................... C23F 1/02
  430/316
2017/0334127 A1 11/2017 Kitano et al.

FOREIGN PATENT DOCUMENTS

JP          5913755 B1    5/2016

* cited by examiner

*Primary Examiner* — Donald J Loney
(74) *Attorney, Agent, or Firm* — Lerner, David, Littenberg, Krumholz & Mentlik, LLP

(57) ABSTRACT

In a decorative sheet, a base material has a concave portion on a front face. The concave portion includes a bottom surface. The bottom surface includes a first surface, a second surface and a third surface. A depth dimension of the first surface is a first value. The depth dimension is a dimension from the front face of the base material along a thickness direction of the base material. The depth dimension of the second surface is a second value which is smaller than the first value. The third surface is a surface which is connected with the first surface at a back side of the thickness direction, and is connected with the second surface at a front side of the thickness direction.

2 Claims, 12 Drawing Sheets

DECORATIVE SHEET

CROSS-REFERENCE TO RELATED APPLICATION

This application claims the benefit of the filing date of Japanese Patent Application No. 2019-039084, filed Mar. 4, 2019, the entire contents of which are hereby incorporated by reference herein.

BACKGROUND OF THE INVENTION

Technical Field

The present disclosure relates to a decorative sheet.

Background Art

Techniques related to decorative sheets have been proposed. Japanese Patent No. 5913755 discloses a seat skin material. The seat skin material is formed by providing an embossed pattern on a front face of an elongated material. The manufacturing method includes a step of pressing the elongated material. In this step, the elongated material passes between an embossing roll and a flat roll. The embossing roll is provided with a plurality of embossing portions protruding from a base surface. The embossing portions include long side surfaces and short side surfaces. The long side surfaces and the short side surfaces are formed perpendicular to the base surface of the embossing roll. In the embossing portions, the highest part from the base surface is formed as flat top surfaces substantially parallel to the base surface. The long side surfaces and the top surfaces are continuous. Five bumps are formed between the short side surfaces and the top surfaces. The five bumps are formed in the same shape and the same size. The five bumps are composed of bottom surfaces and elevation surfaces. The bottom surfaces are surfaces substantially parallel to the base surface. The elevation surfaces are surfaces substantially perpendicular to the base surface. The plurality of embossing portions are arranged in the following state. The state previously described is a state in which the bumps of two adjacent embossing portions face each other. Furthermore, the state previously described is a state in which the long side surfaces of two adjacent embossing portions face each other. A clearance of about 1 mm is formed between the base surface and a front face fabric of the elongated material. The base surface does not contact a front face of the front face fabric of the elongated material. On the front face fabric side of the seat skin material, concave portions are formed by heating and pressing the embossing portions. A front face of the elongate material pressed at the portion where the bumps of the two embossing portions face each other has a shape in which gentle inclined surfaces are adjacent to each other. The front face of the elongated material pressed at the portion where the long side surfaces of the two embossing portions face each other is a steep inclined surface close to vertical. In the seat skin material, the surface gloss changes depending on a viewing direction. A fine level difference due to the bumps of the embossing portions is visually recognized as a thin horizontal line formed on the gentle inclined surface.

SUMMARY

According to one aspect, this specification discloses a decorative sheet including: a base material having a concave portion on a front face, wherein the concave portion including a bottom surface, wherein the bottom surface including: a first surface whose depth dimension which is a dimension from the front face of the base material along a thickness direction of the base material is a first value; a second surface whose depth dimension is a second value which is smaller than the first value; and a third surface which is connected with the first surface at a back side of the thickness direction, and is connected with the second surface at a front side of the thickness direction.

According to the present disclosure, a decorative sheet excellent in design can be obtained.

Figure 9:
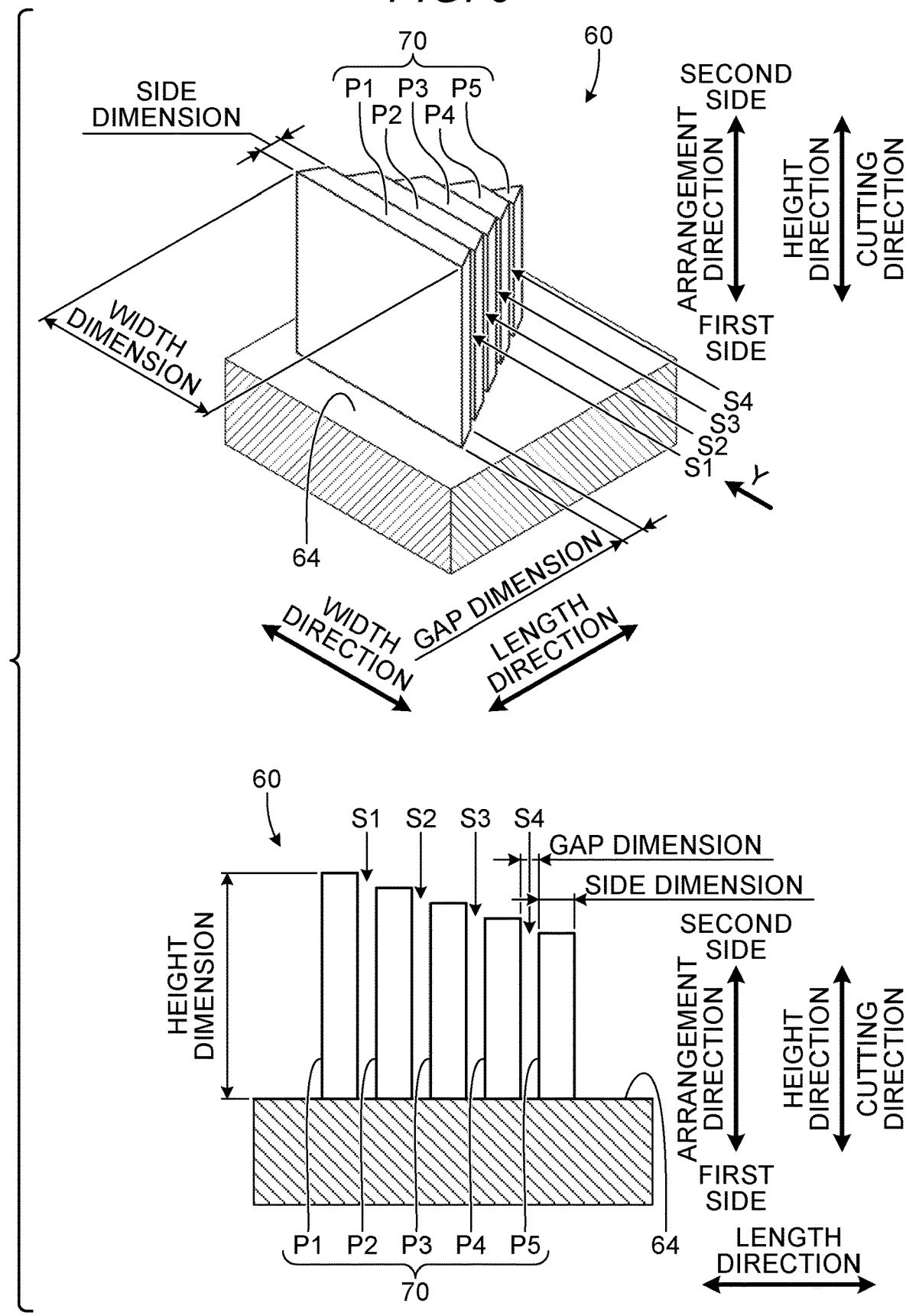

The upper row of FIG. 9 is a perspective view which shows still another example of the schematic configuration of the mold portion. The mold portion corresponds to the concave portion of FIG. 6. A part of the embossing die is shown. The lower row of FIG. 9 is a Y arrow view in the upper row.

Figure 10:
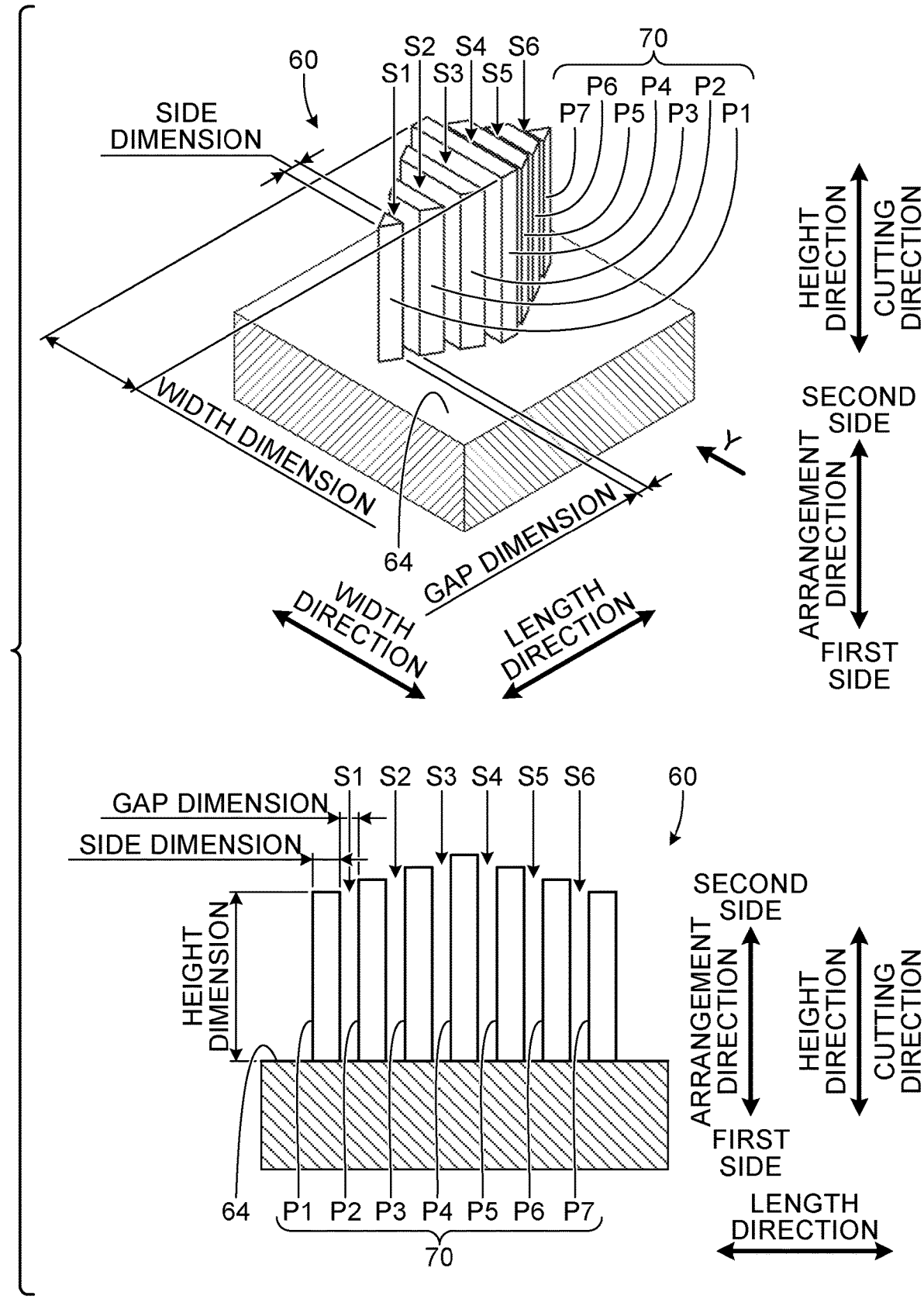

The upper row of FIG. 10 is a perspective view which shows still another example of the schematic configuration of the mold portion. The mold portion corresponds to the concave portion of FIG. 7. A part of the embossing die is shown. The lower row of FIG. 10 is a Y arrow view in the upper row.

Figure 11:
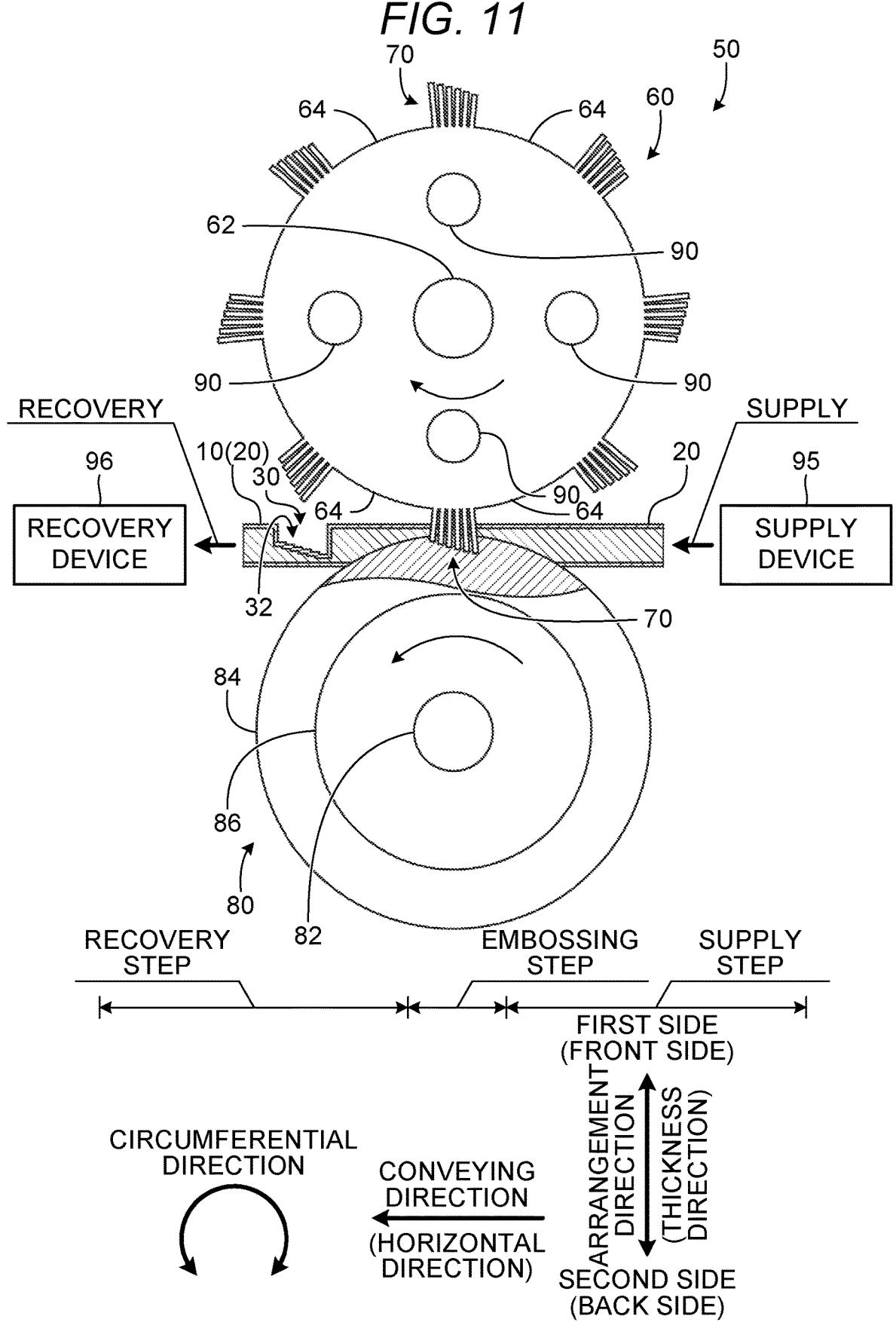

FIG. 11 is a side view which shows another example of the schematic configuration of the embossing apparatus. The embossing die and the embossing receiving die have a roll shape. The embossing die is pressed against the embossing receiving die. Among the base material, the decorative sheet and an elastic portion of the embossing receiving die, a part into which the mold portion of the embossing die bites is shown as a cross section. In the base material and the decorative sheet, parts corresponding to the embossing apparatus are shown.

Figure 12:
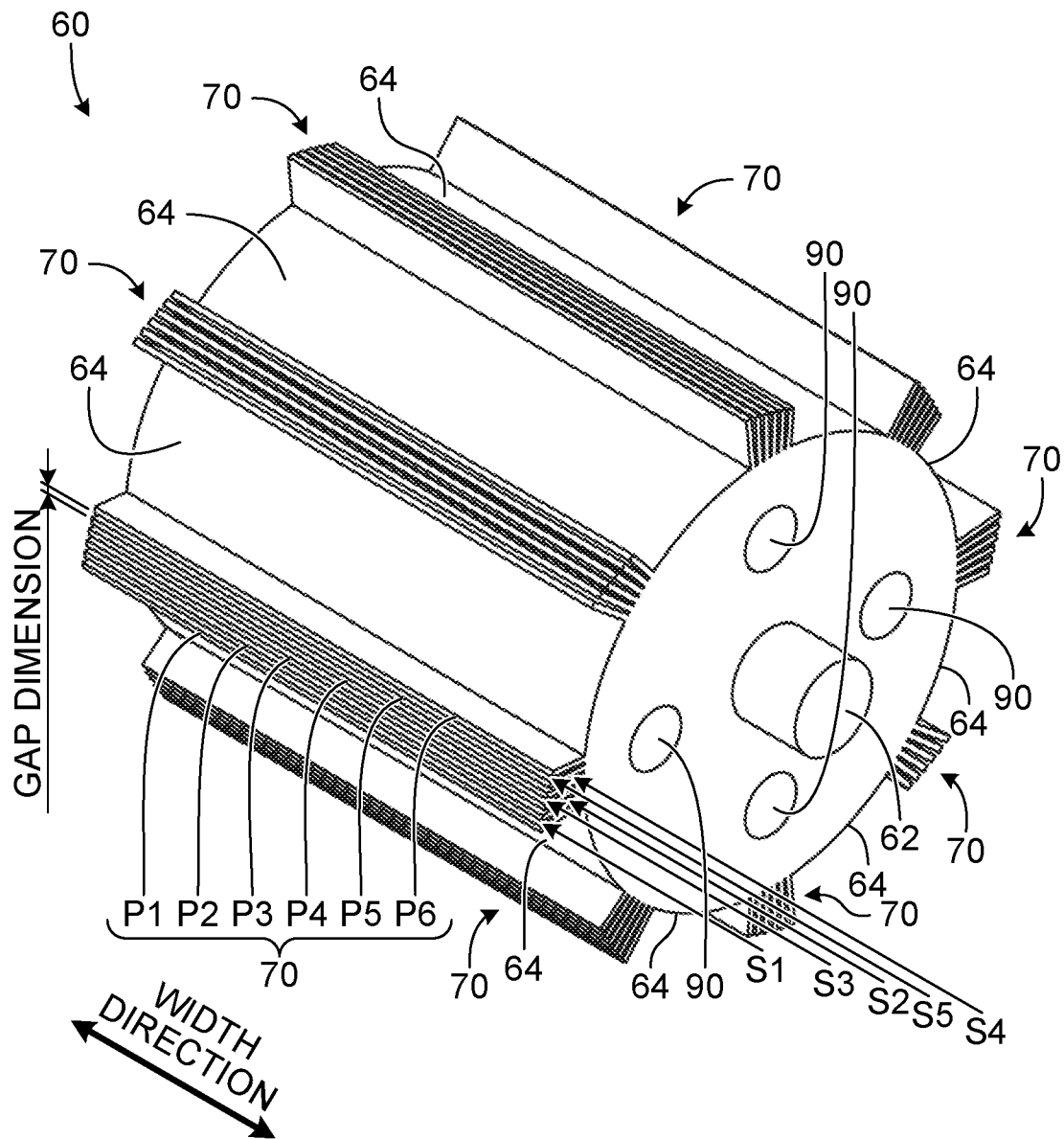

FIG. 12 is a perspective view showing another example of the schematic configuration of the embossing die. The embossing die corresponds to the embossing die of FIG. 11.

DESCRIPTION OF THE EMBODIMENTS

A decorative sheet is a skin material for a predetermined product or part. In the decorative sheet, a concave portion is provided on a front face of a base material. The decorative sheet can enhance the design of the product or part. The inventor considered a concave portion having a new shape that can improve the design of a product or part.

In view of the foregoing, it is an object of the present disclosure to provide a decorative sheet excellent in design.

Embodiments for carrying out the present disclosure will be described with reference to the drawings. The present disclosure is not limited to the configurations described below, and various configurations can be employed based on the same technical idea. For example, a part of the configurations shown below may be omitted or may be replaced by another configuration or the like. Another configuration may be included.

Each drawing of the embodiment schematically shows predetermined configurations. Therefore, in each drawing of the embodiment, correspondence with another drawing or correspondence with a numerical value to be described later specifying the configuration in the drawing may not be accurate in some cases. In each drawing of the embodiment, the dimensions of a predetermined portion such as "depth dimension" and "step dimension" are shown for one arbitrarily selected part. In each drawing of the embodiment, hatching indicates a cross section. The broken line is a hidden line. The two-dot chain line is an imaginary line.

<Decorative Sheet>

A decorative sheet 10 will be described with reference to FIGS. 1 to 3. The decorative sheet 10 is a skin material for a predetermined product or part. The decorative sheet 10 includes a base material 20 and concave portions 30 (see FIG. 1). The concave portions 30 are provided on a front face of the base material 20. In the embodiment, the decorative sheet 10 and the base material 20 are elongated materials. The dimension in a longitudinal direction and the dimension in a transverse direction of the base material 20 are appropriately determined in consideration of various conditions. The decorative sheet 10 includes a plurality of concave portions 30. The plurality of concave portions 30 are formed on the front face of the base material 20 by an embossing apparatus 50. The embossing apparatus 50 carries out an embossing method. The embossing apparatus 50 and the embossing method will be described later. The longitudinal direction of the base material 20 is a longitudinal direction of the decorative sheet 10, and the transverse direction of the base material 20 is a transverse direction of the decorative sheet 10. In the embodiment, the longitudinal direction of the decorative sheet 10 and the base material 20 is referred to as "longitudinal direction" and the transverse direction of the decorative sheet 10 and the base material 20 is referred to as "transverse direction" (see FIGS. 1 and 2). The longitudinal direction and the transverse direction are orthogonal to each other.

As the base material 20, various sheet materials are employed. For example, various sheet materials having different thicknesses are employed as the base material 20. The base material 20 is a laminated body of two or more layers. In this case, the decorative sheet 10 is also a laminated body having the same number of layers as the base material 20. In the embodiment, the base material 20 is a three-layer laminated body and includes a first sheet 22, a second sheet 24 and a third sheet 26 (see FIG. 2). The base material 20 has cushioning properties. In this case, the decorative sheet 10 is also a three-layer laminated body (see FIG. 1) having cushioning properties. However, the base material 20 may be a laminated body of two layers or four layers or more. When the base material 20 is a two-layer laminated body, the base material 20 may be a laminated body including the first sheet 22 and the second sheet 24. The base material 20 may be a single layer sheet material which is not a laminated body. When the base material 20 is a single-layer sheet material, the base material 20 may be a sheet material that can be employed as the first sheet 22 or may be a thick sheet material having cushioning properties.

Figure 1:
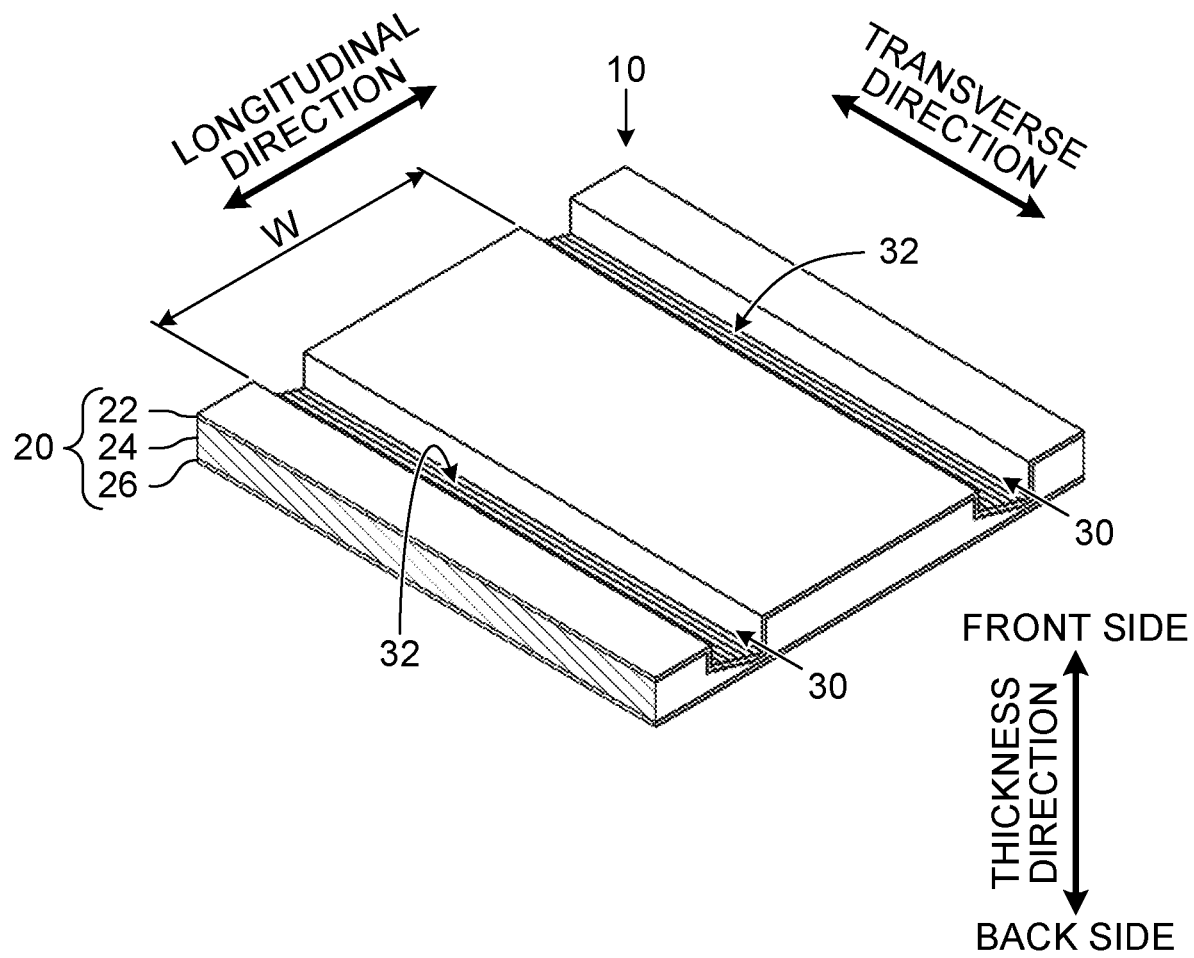
FIG. 1 is a perspective view which shows an example of a schematic configuration of a decorative sheet.
Figure 2:
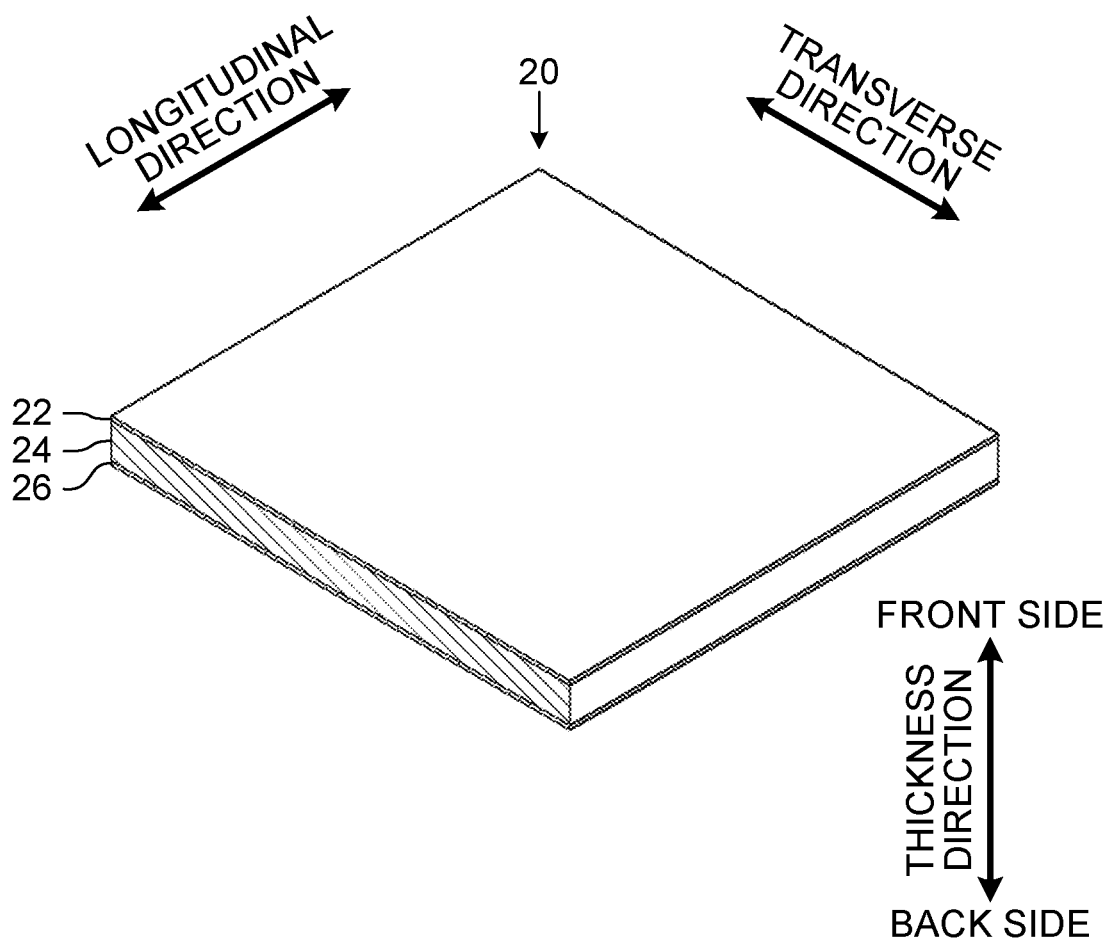
FIG. 2 is a perspective view which shows an example of a schematic configuration of a base material. The base material corresponds to the decorative sheet of FIG. 1 before it is embossed.
Figure 3:
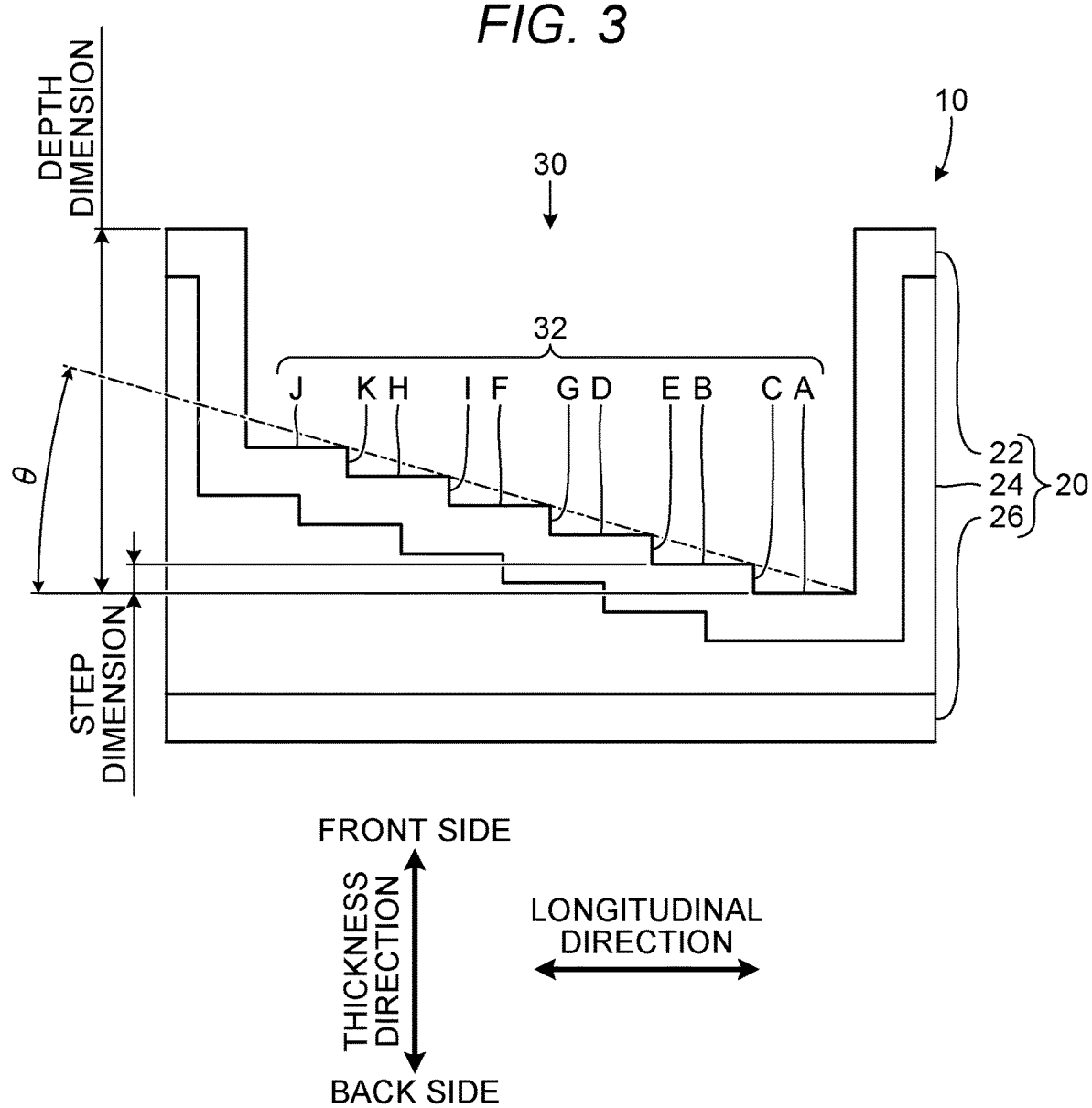
FIG. 3 is a partially enlarged side view which shows an example of a schematic configuration of a concave portion. A part of the decorative sheet of FIG. 1 is shown.

In the embodiment, a thickness direction of the decorative sheet 10 and the base material 20 is referred to as "thickness direction" (see FIGS. 1 to 3). The thickness direction coincides with the direction in which the first sheet 22, the second sheet 24 and the third sheet 26 are laminated in the decorative sheet 10 and the base material 20. One side in the thickness direction is referred to as "front side" and the other side in the thickness direction is referred to as "back side". In the base material 20, the front side in the thickness direction is the side on which the first sheet 22 is provided, and the back side in the thickness direction is the side on which the third sheet 26 is provided. In the base material 20, the first sheet 22, the second sheet 24 and the third sheet 26, a front face is a surface that is on the front side in the thickness direction and a back face is a surface that is on the back side in the thickness direction (see FIG. 2). By embossing, the front face of the base material 20 becomes the front face of the decorative sheet 10 and the back face of the base material 20 becomes the back face of the decorative sheet 10 (see FIGS. 1 and 2). That is, in the state of the decorative sheet 10, the front face of the decorative sheet 10 and the front face of the base material 20 mean the same surface, and the back face of the decorative sheet 10 and the back face of the base material 20 mean the same surface. For example, when the decorative sheet 10 is a skin material for vehicle interiors, the front face of the decorative sheet 10 is the surface of the interior products of the vehicle. The user of the vehicle visually recognizes the front face of the decorative sheet 10 as the surface of the interior products.

The base material 20 is formed by bonding the first sheet 22 to the front face of the second sheet 24 and bonding the third sheet 26 to the back face of the second sheet 24 (see FIG. 2). A known method is employed for bonding the second sheet 24 and the first sheet 22 and bonding the second sheet 24 and the third sheet 26. For example, the bonding previously described is performed through an adhesive or by frame laminate. When comparing the two construction methods previously described, the inventor considers that frame laminate is preferable in terms of process load at the time of manufacturing the base material 20 and weight reduction of the base material 20. Frame laminate is a technology that has already been put to practical use. Therefore, the description regarding the frame laminate is omitted. Prior to bonding to the second sheet 24, the first sheet 22 may be subjected to the following pretreatment. Examples of the pretreatment previously describe include heat setting and boil off. In addition, prior to bonding to the second sheet 24, the first sheet 22 may be subjected to a coloring process or a napping process.

As the first sheet 22, various sheet materials are employed. For example, fibrous sheet materials are employed as the first sheet 22. Examples of the fibrous sheet materials include woven fabrics, knitted fabrics, non-woven fabrics and natural leathers. Natural leather include split leather. Further, as the first sheet 22, the following sheet material is employed. The sheet material previously described is a sheet material in which a synthetic resin is impregnated or laminated on a fibrous sheet material. Examples of such sheet material include artificial leathers, synthetic leathers and polyvinyl chloride leathers. Furthermore, a resin sheet is employed as the first sheet 22. The resin sheet previously described includes a resin film. In addition, as the first sheet 22, a composite material of some or all of the sheet materials previously described is employed.

In the first sheet 22, the fibrous sheet material is better to be a sheet material made of synthetic fibers. Synthetic fibers are excellent in processability in embossing. Preferably, the fibrous sheet material is a sheet material made of thermoplastic resin fibers. Examples of the thermoplastic resin include polyolefin resins, polyester resins, polyamide resins, vinyl chloride resins and polyvinylidene chloride. Examples of the polyolefin resin include polyethylene and polypropylene. An example of the polyester resin include polyethylene terephthalate. Examples of the polyamide resin include nylon 6 and nylon 66.

The inventor considers that polyester resins are preferable among the thermoplastic resins described above. For example, the polyester resins are excellent in the following characteristics. The characteristics previously described are strength, wear resistance and heat resistance. The inventor considers that polyethylene terephthalate is preferable among the polyester resins in terms of the characteristics previously described. However, the fibrous sheet material may be made of fibers made of one or two or more thermoplastic resins selected from the group including the plurality of resins previously described. The fibrous sheet material may be a sheet material in which the following fibers are combined with the thermoplastic resin fibers by the following method within a range that does not affect the characteristics previously described. The fibers previously described are, for example, one or both of natural fibers and regenerated fibers. Examples of the method previously described include mixed spinning, filament mixing, twisting, interweaving and interknitting.

Assuming that the first sheet 22 is a sheet material in which a synthetic resin is impregnated or laminated on a fibrous sheet material. In this case, a known synthetic resin is employed as the resin to be impregnated or laminated. Examples of the synthetic resin previously described include polyurethane resins and vinyl chloride resins. The fibrous sheet material may be colored with a known dye or pigment. The dye or pigment is appropriately selected in consideration of various conditions.

In the first sheet 22, a single fiber fineness of the fibers is better to be set to a predetermined value in the range of 0.2 to 7.0 dtex. By setting the single fiber fineness to 0.2 dtex or more, with the decorative sheet 10 manufactured by the embossing apparatus 50, it is possible to easily make the inner surface of the concave portion 30 free from shine. The texture and design of the decorative sheet 10 can be improved. By setting the single fiber fineness to 7.0 dtex or less, the concave portion 30 can be easily formed on the front face of the base material 20. It is possible to correspond to a concave portion having a complicated shape. Preferably, the single fiber fineness is set to a predetermined value in the range of 4.7 to 7.0 dtex. With the decorative sheet 10 manufactured by the embossing apparatus 50, a bottom surface 32 of the concave portion 30 can be easily formed into a surface having the following shape. The shape previously described is a shape corresponding to a top surface of a mold portion 70 described later. The top surface of the mold portion 70 has a stair-like shape.

In the first sheet 22, a fineness of the yarn is better to be set to a predetermined value in the range of 84 to 504 dtex. By setting the fineness of the yarn to 84 dtex or more, with the decorative sheet 10 manufactured by the embossing apparatus 50, it is possible to easily make the inner surface of the concave portion 30 free from shine. The texture and design of the decorative sheet 10 can be improved. By setting the fineness of the yarn to 504 dtex or less, the concave portion 30 can be easily formed on the front face of the base material 20. It is possible to correspond to a concave portion having a complicated shape. Preferably, the fineness of the yarn is set to a predetermined value in the range of 84 to 167 dtex. With the decorative sheet 10 manufactured by the embossing apparatus 50, the bottom surface 32 of the concave portion 30 can be easily formed into a surface having the following shape. The shape previously described is a shape corresponding to the top surface of the mold portion 70 described later. The top surface of the mold portion 70 has a stair-like shape as described above.

When the first sheet 22 is an elongated woven fabric, a density of the first sheet 22 is better to be set to a predetermined value in the range of 25 to 180 number/25.4 mm in the transverse direction, and better to be set to a predetermined value in the range of 35 to 185 number/25.4 mm in the longitudinal direction. When the first sheet 22 is an elongated knitted fabric, the density of the first sheet 22 is better to be set to a predetermined value in the range of 25 to 85 wale/25.4 mm in the transverse direction, and better to be set to a predetermined value in the range of 25 to 85 course/25.4 mm in the longitudinal direction. By setting the density of the first sheet 22 equal to or more than the lower limit value previously described, the processability of the concave portion 30 can be improved when the embossing method is performed. By setting the density of the first sheet 22 equal to or less than the upper limit value previously described, the texture of the decorative sheet 10 can be improved.

A thickness of the first sheet 22 is better to be set to a predetermined value in the range of 0.5 to 15 mm. However, the thickness of the first sheet 22 may be a value different from the range previously described. The thickness of the first sheet 22 is appropriately determined in consideration of various conditions. When the base material 20 is a single-layer sheet material that can be used as the first sheet 22, the thickness of the base material 20 (first sheet 22) is better to be set to 3 mm or more.

The second sheet 24 has cushioning properties. Accordingly, the base material 20 has cushioning properties. As the second sheet 24, various sheet materials having cushioning properties are employed. An example of such sheet material includes a synthetic resin foam. An example of the synthetic resin foam includes a flexible polyurethane foam.

When the second sheet 24 is a flexible polyurethane foam, a thickness of the second sheet 24 is better to be set to a predetermined value in the range of 3 to 15 mm. Preferably, the thickness of the second sheet 24 made of flexible polyurethane foam is set to a predetermined value in the range of 5 to 10 mm. By setting the previously described thickness to 3 mm or more, the design of the decorative sheet 10 can be improved. It is possible to correspond to a concave portion having a complicated shape. By setting the previously described thickness to 15 mm or less, the texture of the decorative sheet 10 can be improved.

When the second sheet 24 is a flexible polyurethane foam, a density of the second sheet 24 is better to be set to a predetermined value in the range of 16 to 60 kg/m³. Preferably, the density of the second sheet 24 made of flexible polyurethane foam is set to a predetermined value in the range of 20 to 40 kg/m³. The density previously described is an apparent density, and is obtained conforming to JIS K7222: 2005 (foamed plastics and rubbers—how to determine the apparent density). By setting the previously described density to 16 kg/m³ or more, the processability of the concave portion 30 can be improved when the embossing method is performed. By setting the previously described density to 60 kg/m³ or less, the texture of the decorative sheet 10 can be improved.

When the second sheet 24 is a flexible polyurethane foam, a hardness of the second sheet 24 is better to be set to a predetermined value in the range of 36 to 360N. The hardness previously described is obtained conforming to the hardness test D method of JIS K6400-2: 2012 (flexible foam material—physical properties—part 2: how to determine the hardness and compressive stress-strain properties). By setting the previously described hardness to 36 N or more, the processability of the concave portion 30 can be improved when the embossing method is performed. By setting the previously described hardness to 360 N or less, the texture of the decorative sheet 10 can be improved.

When the second sheet 24 is a flexible polyurethane foam, an impact resilience of the second sheet 24 is better to be set to 20% or more. Preferably, the impact resilience of the second sheet 24 made of flexible polyurethane foam is set to 30% or more. The impact resilience previously described is obtained conforming to JIS K6400-3: 2011 (flexible foam material—physical properties—part 3: how to determine the impact resilience). By setting the previously described impact resilience to 20% or more, the processability of the concave portion 30 can be improved when the embossing method is performed. The upper limit value of the impact resilience previously described is not particularly limited. For example, the upper limit value of the impact resilience previously described may be 70% or less.

When the second sheet 24 is a flexible polyurethane foam, a compression residual strain of the second sheet 24 is better to be set to 30% or less. Preferably, the compression residual strain of the second sheet 24 made of flexible polyurethane foam is set to 15% or less. The compression residual strain previously described is obtained conforming to A method (compression at 70° C.) of JIS K6400-4: 2004 (flexible foam material—how to determine the physical properties—part 4: compression residual strain and cyclic compression residual strain). By setting the previously described compression residual strain to 30% or less, the processability of the concave portion 30 can be improved when the embossing method is performed. The lower limit value of the compression residual strain previously described is not particularly limited. For example, the lower limit value of the compression residual strain previously described may be 0% or more.

When the second sheet 24 is a flexible polyurethane foam, a cyclic compression residual strain of the second sheet 24 is better to be set to 10% or less. Preferably, the cyclic compression residual strain of the second sheet 24 made of flexible polyurethane foam is set to 6% or less. The cyclic compression residual strain previously described is obtained conforming to B method (constant displacement method) of JIS K6400-4: 2004 (flexible foam material—how to determine the physical properties—part 4: compression residual strain and cyclic compression residual strain). In the measurement of the cyclic compression residual strain, 50% compression was performed 80000 times at room temperature. By setting the previously described cyclic compression residual strain to 10% or less, the processability of the concave portion 30 can be improved when the embossing method is performed. The lower limit value of the cyclic compression residual strain previously described is not particularly limited. For example, the lower limit value of the cyclic compression residual strain previously described may be 0% or more.

As the third sheet 26, various sheet materials are employed. For example, as the third sheet 26, a woven fabric, a knitted fabric or a non-woven fabric is employed. The third sheet 26 is better to be a sheet material made of synthetic fiber. Examples of the synthetic fiber include the resin fibers described above in relation to the first sheet 22. For example, the third sheet 26 may be a sheet material made of polyester resin fibers.

In the base material 20, 5% modulus is better to be set to a predetermined value in the range of 10 to 500N. The 5% modulus is a modulus at 5% expansion and is measured by the following test method. When the base material 20 is a woven fabric, a warp direction coincides with a woven direction. When the base material 20 is a knitted fabric, a warp direction coincides with a knitting direction. The warp direction coincides with the direction defined as the longitudinal direction in the embodiment.

[Test Method]

Specimen shape: φ300 mm

Testing device: Instron type tensile testing machine (Autograph AG-1 manufactured by SHIMADZU CORPORATION)

Grade placement: center portion of specimen, warp direction

Grade interval: 200 mm

Tensile speed: 200 mm/min

By setting the 5% modulus to 10 N or more, the concave portion 30 can be easily formed on the front face of the base material 20. By setting the 5% modulus 500 N or less, the design of the decorative sheet 10 can be improved. It is possible to correspond to a concave portion having a complicated shape. Preferably, the 5% modulus is set to a predetermine value in the range of 109 to 498N. By setting the 5% modulus in the previously described range, the bottom surface 32 of the concave portion 30 can be easily formed into a surface having the following shape with the decorative sheet 10 manufactured by the embossing apparatus 50. The previously described shape is a shape corresponding to the top surface of the mold portion 70 described later. The top surface of the mold portion 70 has a stair-like shape as described above.

In the decorative sheet 10, the plurality of concave portions 30 are repeatedly arranged at a predetermined interval W in the longitudinal direction (see FIG. 1). Along with this, the front face of the decorative sheet 10 becomes uneven. However, the arrangement of the plurality of concave portions 30 is an example. The arrangement of the plurality of concave portions 30 is appropriately determined in consideration of various conditions. In the decorative sheet, it is sufficient that at least one concave portion 30 is provided. The plurality of concave portions 30 are concave portions having the same shape. However, the plurality of concave portions 30 may be concave portions having different shapes.

The concave portion 30 crosses the base material 20 in the transverse direction (see FIG. 1). The concave portion 30 includes the bottom surface 32 (see FIGS. 1 and 3). The bottom surface 32 has a stair-like shape that inclines with respect to the front face of the base material 20 (see FIG. 3). An angle θ of FIG. 3 corresponds to the inclination angle of the bottom surface 32. In the embodiment, the bottom surface 32 has a six-tier shape. Accordingly, the bottom surface 32 includes a first surface A, a second surface B, a third surface C, a fourth surface D, a fifth surface E, a sixth surface F, a seventh surface G, an eighth surface H, a ninth surface I, a tenth surface J and an eleventh surface K. In other words, the first surface A to the eleventh surface K form the bottom surface 32.

The first surface A has a depth dimension set to a first value. The second surface B has a depth dimension set to a second value. The third surface C is connected to the first surface A on the back side in the thickness direction, and is connected to the second surface B on the front side in the thickness direction. The fourth surface D has a depth dimension set to a third value. The fifth surface E is connected to the second surface B on the back side in the thickness direction, and is connected to the fourth surface D on the front side in the thickness direction. The sixth surface F has a depth dimension set to a fourth value. The seventh surface G is connected to the fourth surface D on the back side in the thickness direction, and is connected to the sixth surface F on the front side in the thickness direction. The eighth surface H has a depth dimension set to a fifth value. The ninth surface I is connected to the sixth surface F on the back side in the thickness direction, and is connected to the eighth surface H on the front side in the thickness direction. The tenth surface J has a depth dimension set to a sixth value. The eleventh surface K is connected to the eighth surface H on the back side in the thickness direction, and is connected to the tenth surface J on the front side in the thickness direction. The depth dimension is a dimension from the front face of the base material 20 along the thickness direction (see FIG. 3).

The first surface A, the second surface B, the fourth surface D, the sixth surface F, the eighth surface H and the tenth surface J have a rectangular planar shape having a long side and a short side, and are surfaces along the front face of the base material 20. The third surface C, the fifth surface E, the seventh surface G, the ninth surface I and the eleventh surface K have a rectangular planar shape having a long side and a short side, and are surfaces along the thickness direction. The long sides of the first surface A to the eleventh surface K are sides along the transverse direction. The short sides of the first surface A, the second surface B, the fourth surface D, the sixth surface F, the eighth surface H and the tenth surface J are sides along the longitudinal direction. The short sides of the third surface C, the fifth surface E, the seventh surface G, the ninth surface I and the eleventh surface K are sides along the thickness direction. However, the third surface C, the fifth surface E, the seventh surface G, the ninth surface I and the eleventh surface K may be surfaces inclined with respect to the front face of the base material 20 and with respect to the thickness direction. In this case, the short sides of the third surface C, the fifth surface E, the seventh surface G, the ninth surface I and the eleventh surface K become sides that are inclined with respect to the front face of the base material 20 and with respect to the thickness direction.

The fifth surface E is a surface whose step dimension is the same value as that of the third surface C. The seventh surface G is a surface whose step dimension is the same value as those of the third surface C and the fifth surface E. The ninth surface I is a surface whose step dimension is the same value as those of the third surface C, the fifth surface E and the seventh surface G. The eleventh surface K is a surface whose step dimension is the same value as those of the third surface C, the fifth surface E, the seventh surface G and the ninth surface I. The step dimension is a dimension along the thickness direction of the third surface C, the fifth surface E, the seventh surface G, the ninth surface I and the eleventh surface K. In other words, the step dimension is the difference in the depth dimension between the following two surfaces. The previously described two surfaces are two surfaces among the first surface A, the second surface B, the fourth surface D, the sixth surface F, the eighth surface H and the tenth surface J that are connected to one of the third surface C, the fifth surface E, the seventh surface G, the ninth surface I and the eleventh surface K, respectively on the back side and the front side in the thickness direction (see FIG. 3). That is, the step dimension of the third surface C is the difference between the depth dimension of the first surface A and the depth dimension of the second surface B. The step dimension of the fifth surface E is the difference between the depth dimension of the second surface B and the depth dimension of the fourth surface D. The step dimension of the seventh surface G is the difference between the depth dimension of the fourth surface D and the depth dimension of the sixth surface F. The step dimension of the ninth surface I is the difference between the depth dimension of the sixth surface F and the depth dimension of the eighth surface H. The step dimension of the eleventh surface K is the difference between the depth dimension of the eighth surface H and the depth dimension of the tenth surface J.

Therefore, in the bottom surface 32, the depth dimensions of the first surface A, the second surface B, the fourth surface D, the sixth surface F, the eighth surface H and the tenth surface J are gradually decreased, and is set to become as "A>B>D>F>H>J". In the embodiment, the first surface A, the second surface B, the fourth surface D, the sixth surface F, the eighth surface H and the tenth surface J are flat surfaces having the same shape, and the third surface C, the fifth surface E, the seventh surface G, the ninth surface I and the eleventh surface K are flat surfaces having the same shape.

<Embossing Apparatus>

The embossing apparatus 50 will be described with reference to FIGS. 4 and 5. The embossing apparatus 50 is a processing apparatus that manufactures the decorative sheet 10. The embossing apparatus 50 conveys the elongated base material 20 fed out from a supply device 95 and performs embossing on the base material 20 (see FIG. 4). The embossing apparatus 50 continuously performs embossing. After being embossed by the embossing apparatus 50, the base material 20 is recovered by a recovery device 96 as the decorative sheet 10.

Figure 4:
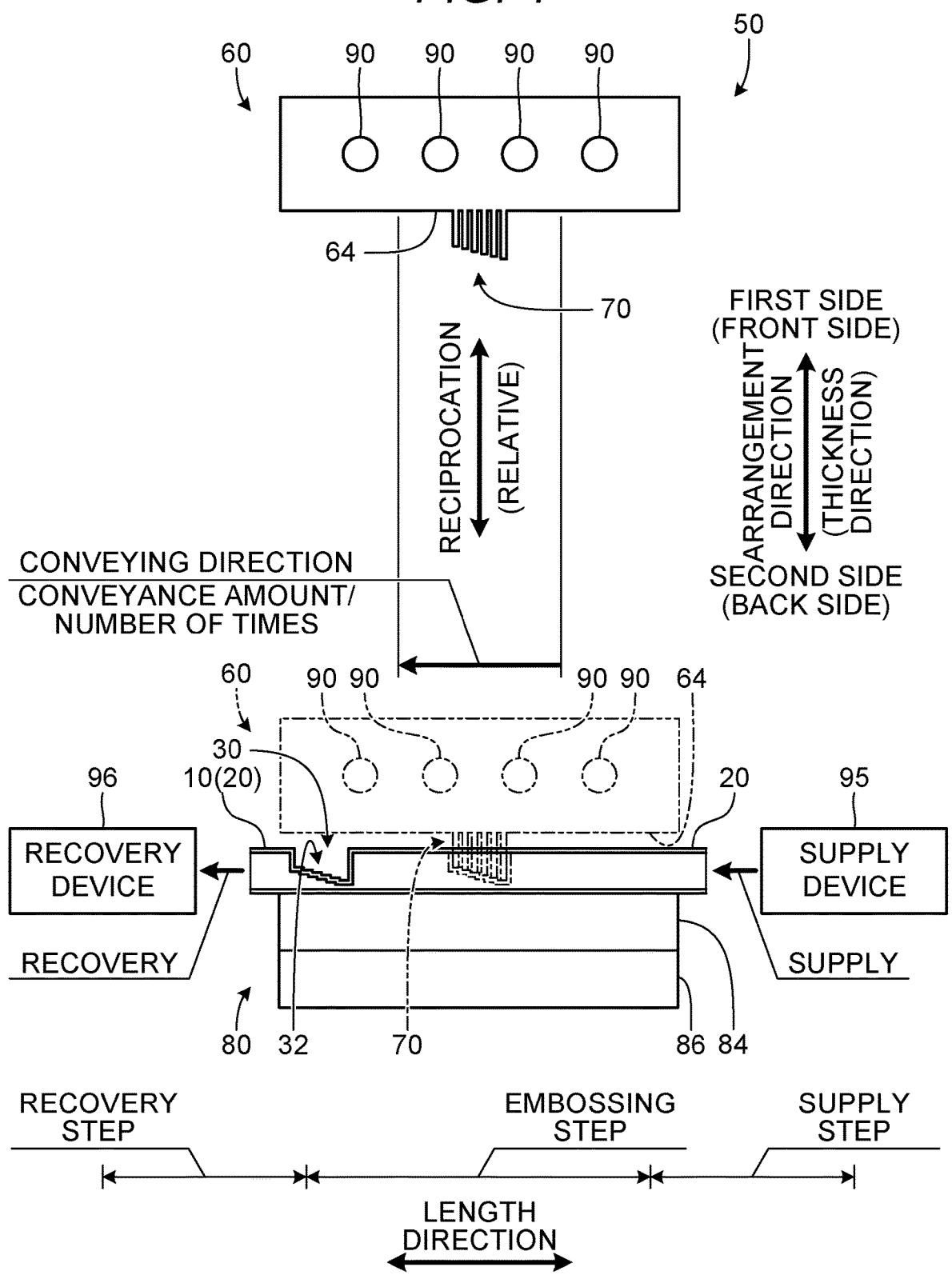
FIG. 4 is a side view which shows an example of a schematic configuration of an embossing apparatus. An embossing die and an embossing receiving die have a flat plate shape. In the base material and the decorative sheet, parts corresponding to the embossing apparatus are shown.

In FIG. 4, the illustrations of the supply device 95 and the recovery device 96 are simplified. The base material 20 and the decorative sheet 10 have an aspect of an elongated sheet material which is continuous from the supply device 95 to the recovery device 96. As the supply device 95, a supply device provided in a known embossing apparatus can be employed. As the recovery device 96, a recovery device provided in a known embossing apparatus can be employed. Therefore, the description regarding the supply device 95 and the recovery device 96 is omitted. In the embodiment, a direction in which the base material 20 and the decorative sheet 10 are conveyed from the supply device 95 toward the recovery device 96 is referred to as "conveying direction". The conveying direction is a direction along the longitudinal direction.

The embossing apparatus 50 includes an embossing die 60, an embossing receiving die 80 and a heating unit 90. The embossing die 60 has a flat plate shape. The embossing receiving die 80 has a flat plate shape. The embossing die 60 and the embossing receiving die 80 are provided side by side in an arrangement direction. The embossing die 60 is provided on a first side in the arrangement direction. The embossing receiving die 80 is provided on a second side in the arrangement direction.

In the embodiment, the arrangement direction is a vertical direction, and the conveying direction is a horizontal direction. The first side in the arrangement direction is an upper side in the vertical direction, and the second side in the arrangement direction is a lower side in the vertical direction. In this case, the thickness direction of the base material 20 coincides with the vertical direction. A width direction (see FIG. 5) of the embossing die 60 coincides with the transverse direction and a width direction of the embossing receiving die 80 coincides with the width direction of the embossing die 60 and the transverse direction. In the embodiment, the width direction of the embossing die 60 and the width direction of the embossing receiving die 80 are referred to as "width direction". A direction perpendicular to the width direction is referred to as "length direction" as the direction for specifying the flat-plate embossing die 60 and the flat-plate embossing receiving die 80 (see FIGS. 4 and 5). The length direction coincides with the longitudinal direction and is a direction along the conveying direction. The arrangement direction may be a direction different from the vertical direction. The conveying direction may be a direction different from the horizontal direction. The conveying direction is better to be a direction orthogonal to the arrangement direction.

The embossing die 60 moves relative to the embossing receiving die 80 in the arrangement direction. In this relative movement, the following movement is repeated. The movements previously described are a movement from the first side to the second side in the arrangement direction and a movement from the second side to the first side in the arrangement direction. The relative movement between the embossing die 60 and the embossing receiving die 80 is performed by reciprocating the embossing die 60 in the arrangement direction with the position of the embossing receiving die 80 being fixed (see FIG. 4). However, in FIG. 4, the illustration of the following drive mechanism is omitted. The drive mechanism previously described is a mechanism for reciprocating the embossing die 60 in the arrangement direction. The embossing die 60 is formed of the same material as a known embossing die. For example, the embossing die 60 is made of metal. An example of the metal forming the embossing die 60 include steel material.

Figure 5:
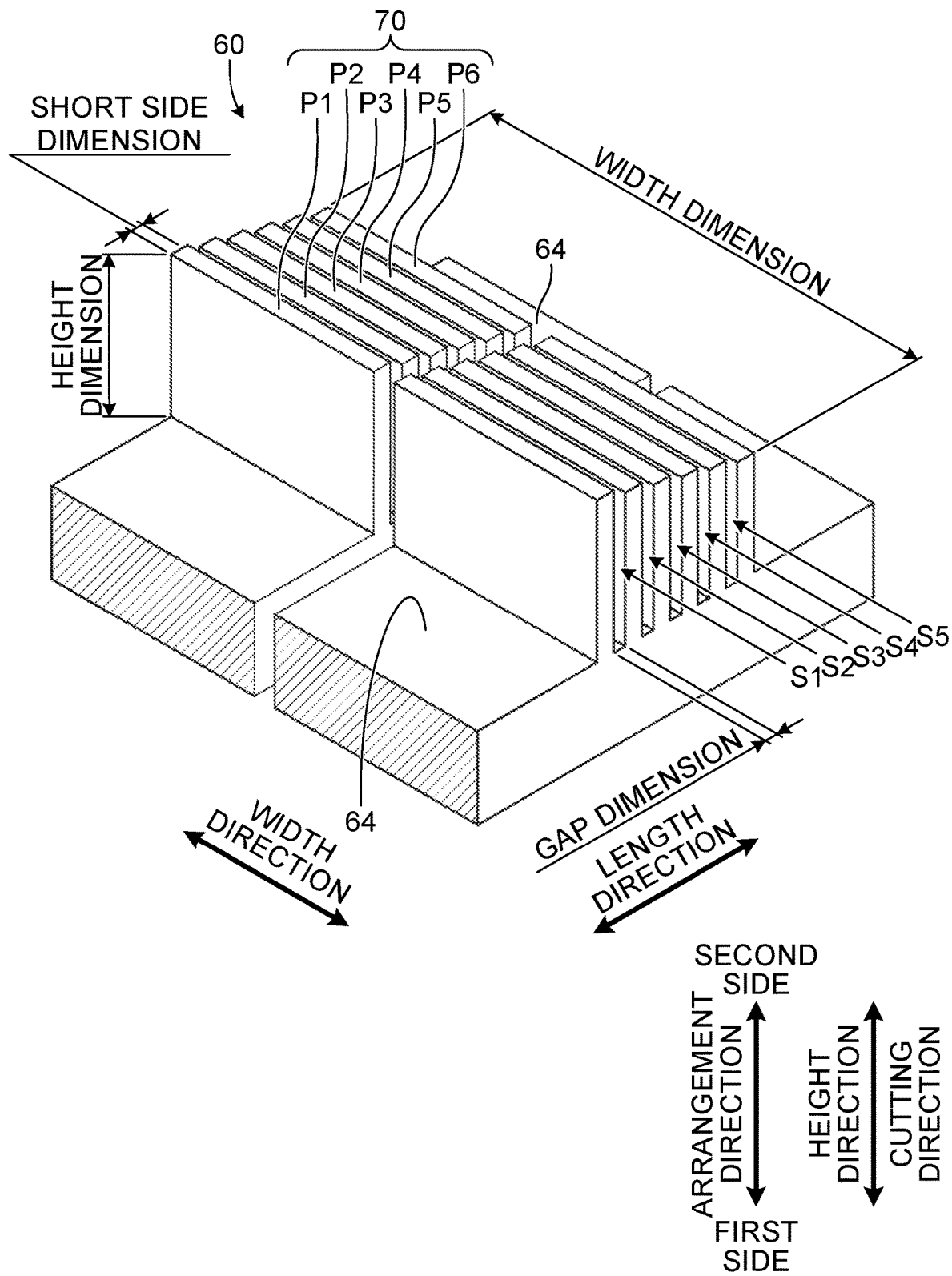
FIG. 5 is a perspective view which shows an example of a schematic configuration of a mold portion. The mold portion corresponds to the mold portion of the embossing die of FIG. 4. A part of the embossing die is shown with a part omitted in a width direction.

The embossing die 60 includes the mold portion 70 (see FIGS. 4 and 5). The mold portion 70 has a shape corresponding to the concave portion 30 (see FIGS. 1, 4 and 5). During the embossing method, the mold portion 70 is in contact with the front face of the base material 20 and presses the front face of the base material 20 (see "embossing die 60" indicated by a two-dot chain line of FIG. 4). Along with this, the mold portion 70 forms the concave portion 30 on the front face of the base material 20. One mold portion 70 corresponds to one concave portion 30. One concave portion 30 is formed on the front face of the base material 20 by one mold portion 70. Slits S are formed on an outer surface of the mold portion 70 which contacts with the front face of the base material 20. The slits S are gaps whose cutting direction corresponds to a height direction of the mold portion 70. In the embodiment, the height direction and the cutting direction coincide with the arrangement direction (see FIG. 5). The mold portion 70 is divided by the slits S. That is, the mold portion 70 is an aggregate of a plurality of protrusions P. The plurality of protrusions P are adjacent to each other through the slit S.

In the embodiment, one mold portion 70 includes six protrusions P1, P2, P3, P4, P5 and P6 divided by five slits S1, S2, S3, S4 and S5 (see FIG. 5). The protrusion P1 is adjacent to the protrusion P2 through the slit S1. The protrusion P2 is adjacent to the protrusion P3 through the slit S2. The protrusion P3 is adjacent to the protrusion P4 through the slit S3. The protrusion P4 is adjacent to the protrusion P5 through the slit S4. The protrusion P5 is adjacent to the protrusion P6 through the slit S5. The slits S1, S2, S3, S4 and S5 are provided in the mold portion 70 along the width direction. Accordingly, the direction in which the protrusions P1, P2, P3, P4, P5, and P6 are adjacent to each other coincides with the length direction. Width dimensions of the protrusions P1, P2, P3, P4, P5 and P6 coincide with width dimensions of the slits S1, S2, S3, S4 and S5. The width dimension is a dimension in the width direction.

In the embodiment, the protrusions P1, P2, P3, P4, P5 and P6 are referred to as "protrusion P" when they are not distinguished from each other or collectively referred. The slits S1, S2, S3, S4 and S5 are referred to as "slit 5" when they are not distinguished from each other or are collectively referred. A surface on the second side in the arrangement direction of the protrusion P is referred to as "top surface".

The top surfaces of the protrusions P1, P2, P3, P4, P5 and P6 have the same shape. The top surface of the protrusion P has a rectangular planar shape having a long side and a short side. The long side of the top surface of the protrusion P is a side along the width direction. Therefore, it can be said that the width dimension of the protrusion P is also the long side dimension of the protrusion P. The short side of the top surface of the protrusion P is a side along the length direction. The top surface of the protrusion P is provided along a base surface 64, and a side surface of the protrusion P is provided perpendicular to the base surface 64 (see FIG. 5). The side surface of the protrusion P is a surface along the arrangement direction of the protrusion P, and forms a space that becomes the slit S. The base surface 64 is a region on a surface of the second side in the arrangement direction of the embossing die 60 where the mold portion 70 is not provided. The embossing die 60 faces the embossing receiving die 80 in the arrangement direction with the surface on the second side in the arrangement direction.

A height dimensions of the protrusions P gradually decreases in the order of the protrusion P1, the protrusion P2, the protrusion P3, the protrusion P4, the protrusion P5 and the protrusion P6, and is set to "P1>P2>P3>P4>P5>P6" (see FIG. 5). For example, the height dimension of the protrusion P may be reduced at a constant rate or at a close rate to the constant rate. The height dimension is a dimension in the height direction. Along with this, the top surface of the mold portion 70 has a stair-like shape. The top surface of the mold portion 70 includes the top surfaces of the protrusions P1, P2, P3, P4, P5 and P6. That is, the top surfaces of the protrusions P1, P2, P3, P4, P5 and P6 form the top surface of the mold portion 70.

The dimensional difference in height between adjacent protrusions P is better to be set to a predetermined value in the range of 0.2 to 2.0 mm. By setting the dimensional difference in height between adjacent protrusions P in the previously described range, the concave portion 30 can be easily formed on the front face of the base material 20. It is possible to correspond to a concave portion having a complicated shape. The dimensional difference in height between adjacent protrusions P has the same value for all combinations of adjacent protrusions P among the plurality of protrusions P. That is, the previously described dimensional difference is "P1-P2=P2-P3=P3-P4=P4-P5=P5-P6". The previously described dimensional differences all coincide with the step dimensions of the third surface C, the fifth surface E, the seventh surface G, the ninth surface I and the eleventh surface K.

The short side dimension of the protrusion P is better to be set to a predetermined value in the range of 0.3 to 5.0 mm. By setting the short side dimension of the protrusion P to 0.3 mm or more, the processability of the concave portion 30 can be improved when the embossing method is performed. By setting the short side dimension of the protrusion P to 5.0 mm or less, the inner surface of the concave portion 30 can be easily made free from shine. The texture and design of the decorative sheet 10 can be improved. Preferably, the short side dimension of the protrusion P is set to a predetermined value in the range of 1.0 to 5.0 mm. By setting the short side dimension of the protrusion P in the previously described range, the bottom surface 32 can be formed in a stair-like shape corresponding to the variation of the height dimension of the top surface of the mold portion 70. It can be said that the short side dimension of the protrusion P is also a dimension of the protrusion P in the length direction.

A gap dimension of the slit S is better to be set to a predetermined value in the range of 0.6 to 2.5 mm. The gap dimension is a dimension in the length direction of the slit S. The gap dimensions of the plurality of slits S are all better to be set to the same value. That is, the gap dimension of the slit S is better to be "S1=S2=S3=S4=S5". In this regard, the mold portion 70 of FIGS. 4 and 5, and FIGS. 8, 11 and 12 described later satisfies the previously described conditions. The gap dimension of the slit S coincides with the interval between the adjacent protrusions P. In the plurality of slits S, by setting the gap dimension to 0.6 mm or more, the inner surface of the concave portion 30 can be easily made free from shine. The texture and design of the decorative sheet 10 can be improved. By setting the gap dimension to 2.5 mm or less, the concave portions formed by embossing can be made into a unified concave portion 30. Preferably, the gap dimension of the slit S is set to a predetermined value in the range of 1.5 to 2.5 mm. By setting the gap dimension in the previously described range, the bottom surface 32 can be formed in a stair-like shape corresponding to the variation of the height dimension of the top surface of the mold portion 70.

In the mold portion 70, an area ratio of the following second area to the following first area (second area/first area) is better to be set to a predetermined value in the range of 38 to 51%. The first area is a total area of the following two total areas. The two total areas previously described are the total area of the plurality of protrusions P frontally viewed from the second side in the arrangement direction and the total area of the plurality of slits S frontally viewed from the second side in the arrangement direction. In other words, the first area is the total area of the mold portion 70 frontally viewed from the second side in the arrangement direction. The second area is the total area of the plurality of protrusions P frontally viewed from the second side in the arrangement direction. By setting the previously described area ratio to 38% or more, the concave portion 30 can be easily formed on the front face of the base material 20. It is possible to correspond to a concave portion having a complicated shape. By setting the previously described area ratio to 51% or less, the inner surface of the concave portion 30 can be easily made free from shine. The texture and design of the decorative sheet 10 can be improved. However, the ratio of the second area to the first area may be a predetermined value in the range of 32 to 65%.

In the mold portion 70, the second area is appropriately determined according to the shape of the concave portion 30. However, the second area is better to be set to a predetermined value in the range of 47 to 1200 mm$^2$. By setting the second area to 47 mm$^2$ or more, the processability of the concave portion 30 can be improved when the embossing method is performed. By setting the second area to 1200 mm$^2$ or less, the inner surface of the concave portion 30 can be easily made free from shine. The texture and design of the decorative sheet 10 can be improved. With respect to one protrusion P, the area of the protrusion P frontally viewed from the second side in the arrangement direction is appropriately determined in consideration of various conditions. For example, in determining the previously described area of one protrusion P, the shape of the concave portion 30 is considered as in the case of the second area.

The embossing receiving die 80 includes an elastic portion 84 and a main body portion 86 (see FIG. 4). The elastic portion 84 is made of resin. The elastic portion 84 is provided on a surface on the first side in the arrangement direction of the main body portion 86. The elastic portion 84 is integrated with the main body portion 86. The main body 86 is formed of the same material as the embossing die 60. A surface on the first side in the arrangement direction of the elastic portion 84 is a smooth surface. The surface on the first side in the arrangement direction of the elastic portion 84 forms the surface on the first side in the arrangement direction of the embossing receiving die 80. The surface on the first side in the arrangement direction of the embossing receiving die 80 forms the outer surface of the embossing receiving die 80. The embossing receiving die 80 faces the embossing die 60 in the arrangement direction with the surface on the first side in the arrangement direction. The elastic portion 84 is formed of a known resin. Examples of the resin previously described include rubbers, thermoplastic elastomers and plastics. The inventor considers that rubber is preferable among the previously described resins. The inventor considers that silicone rubber is preferable in terms of heat resistance, durability and versatility. Silicone rubber is inexpensive.

The heating unit 90 is provided in the embossing die 60. The heating unit 90 is embedded in the embossing die 60. The heating unit 90 is an electric heater. In the embodiment, four heating units 90 are embedded at equiangular intervals in the embossing die 60. However, the heating unit 90 may be a different type of heating unit from the electric heater. The number of the heating units 90 may be three or less or five or more. The type and number of the heating units 90 are appropriately determined in consideration of various conditions. The arrangement of the heating units 90 in the embossing die 60 is appropriately determined in consideration of various conditions.

The heating units 90 heat the embossing die 60 to a predetermined temperature. The previously described temperature is appropriately set according to the type of the base material 20. For example, the previously described temperature is appropriately set in consideration of the material of one or both of the first sheet 22 and the second sheet 24. Assuming that the first sheet 22 is polyethylene terephthalate. The melting point of polyethylene terephthalate is 260° C. In this case, the heating units 90 heat the embossing die 60 to a predetermined value in the range of 60 to 260° C. Preferably, the heating units 90 heat the embossing die 60 to a predetermined value in the range of 60 to 220° C. More preferably, the heating units 90 heat the embossing die 60 to a predetermined value in the range of 130 to 210° C.

<Embossing Method>

The embossing method will be described with reference to FIGS. 1, 2 and 4. The embossing method is performed by the embossing apparatus 50. The embossing method includes a supply step, an embossing step and a recovery step (see FIG. 4). The decorative sheet 10 of FIG. 1 is manufactured from the base material 20 of FIG. 2 by this embossing method. Therefore, it can be said that the embossing method is also the method for manufacturing the decorative sheet 10. In the embossing method, the supply step, the embossing step and the recovery step are sequentially performed while the base material 20 is intermittently conveyed in the conveying direction. The supply step is repeatedly performed. The embossing step is repeatedly performed. The recovery step is repeatedly performed. In the decorative sheet 10, a plurality of concave portions 30 are repeated at a predetermined interval W in the longitudinal direction (see FIG. 1). In the embossing apparatus 50, one mold portion 70 is provided with the embossing die 60 (see FIG. 4). Therefore, in the embossing apparatus 50, a single conveyance amount of the base material 20 is set to an amount corresponding to the interval W.

In the embossing method, the concave portion 30 is formed on the front face of the base material 20 by pressing the base material 20 (see FIGS. 2 and 1). The heating units 90 heat the embossing die 60. The embossing method is performed in a state where the embossing die 60 is heated to a predetermined temperature. In the embossing apparatus 50, a heating unit such as the heating unit 90 is not provided in the embossing receiving die 80. Therefore, in the embossing method, the embossing receiving die 80 is not directly heated. However, in the embossing apparatus 50, the embossing receiving die 80 may be provided with a heating unit. Thereby, the embossing method can be performed in a state where the embossing receiving die 80 is heated to a predetermined temperature by the heating unit. When the heating unit is provided in the embossing receiving die 80, the temperature of the embossing receiving die 80 heated by the heating unit is appropriately set in consideration of various conditions. Whether or not the embossing receiving die 80 is provided with a heating unit is appropriately determined in consideration of various conditions.

Prior to performing the embossing method, the embossing apparatus 50 is adjusted so that the following position is in the following first state. The previously described position is a position in the arrangement direction of the embossing die 60 with respect to the front face of the base material 20. The first state is a state in which the base surface 64 is not in contact with the front face of the base material 20. The first state is based on the embossing die 60 which is moved to the moving end on the second side in the arrangement direction. The embossing die 60 indicated by a two-dot chain line of FIG. 4 indicates the embossing die which is moved to the moving end on the second side in the arrangement direction.

The embossing apparatus 50 may be in the following second state and third state. The second state is a state in which the mold portion 70 bites into the elastic portion 84. The third state is a state in which the following dimension is larger than the thickness of the base material 20. The previously described dimension is a dimension in the arrangement direction between the base surface 64 and the outer surface of the embossing receiving die 80 (the surface on the first side in the arrangement direction). By performing the embossing method with the embossing apparatus 50 in the second state and the third state, the shape of the entire inner surface of the concave portion 30 can be made clear (defined). Along with this, the design of the decorative sheet 10 can be improved. The second state and the third state are based on the embossing die 60 which is moved to the moving end on the second side in the arrangement direction, as in the first state described above. In FIG. 4, the embossing die 60 indicated by a two-dot chain line and the elastic portion 84 are not illustrated in an aspect corresponding to the second state.

The supply step is a step of supplying the base material 20 to the embossing apparatus 50 (see FIG. 4). That is, in the supply step, the base material 20 is fed out from the supply device 95. The base material 20 fed out from the supply device 95 is conveyed in the conveying direction and reaches the embossing device 50.

The embossing step is a step of forming a plurality of concave portions 30 on the front face of the base material 20 (see FIG. 4). In the embossing step, the base material 20 that has reached the embossing apparatus 50 is embossed. The base material 20 conveyed in the conveying direction reaches on the embossing receiving die 80 during the conveyance. At this time, the base material 20 is in contact with the elastic portion 84 on the back face and is supported by the embossing receiving die 80 from the back side. The embossing die 60 moves from the first side to the second side in the arrangement direction and reaches the moving end on the second side in the arrangement direction (see "embossing die 60" indicated by a two-dot chain line of FIG. 4). Along with this, the embossing die 60 sandwiches the base material 20 together with the embossing receiving die 80. The base material 20 is in contact with the mold portion 70 on the front face and is pressed by the mold portion 70. However, the front face of the base material 20 does not contact the base surface 64. The base material 20 is heated by the heat from the embossing die 60 heated by the heating units 90. The mold portion 70 bites into the base material 20. Thereafter, the embossing die 60 moves from the second side to the first side in the arrangement direction and reaches the moving end on the first side (see "embossing die 60" indicated by solid lines of FIG. 4). The base material 20 is formed into the decorative sheet 10 by the embossing step (see FIGS. 2 and 1).

The base material 20 is conveyed by the conveyance amount corresponding to the interval W in the conveying direction at the following timing. The timing previously described is a predetermined timing after the embossing die 60 moves from the second side to the first side in the arrangement direction and the mold portion 70 is separated from the base material 20. The recovery step is a step of recovering the base material 20 that has passed through the embossing apparatus 50 (see FIG. 4). That is, in the recovery step, the decorative sheet 10 is recovered from the embossing apparatus 50 by the recovery device 96.

In the embossing step, a pressing time of the base material 20 is better to be set to a predetermined value in the range of 0.1 to 60 seconds. Preferably, the pressing time of the base material 20 is set to a predetermined value in the range of 1.0 to 10 seconds. The pressing time of the base material 20 is appropriately set in consideration of the shape of the mold portion 70. By setting the pressing time of the base material 20 to 0.1 seconds or more, a pressing force can be appropriately applied to the base material 20. A sufficient concave portion 30 can be formed on the front face of the base material 20. By setting the pressing time of the base material 20 to 60 seconds or less, the following defects can be prevented from occurring to the inner surface of the concave portion 30. The previously described defects are shine, discoloration and tearing. The same applies to the back face of the decorative sheet 10. By setting the pressing time of the base material 20 to 60 seconds or less, the embossing receiving die 80 can be suppressed from being deformed by the heat from the embossing die 60.

In the embossing step, the pressing force of the base material 20 is better to be set to a predetermined value in the range of 100 to 2000 N/cm. By setting the pressing force of the base material 20 to 100 N/cm or more, the pressing force can be appropriately applied to the base material 20. A sufficient concave portion 30 can be formed on the front face of the base material 20. By setting the pressing force of the base material 20 to 2000 N/cm or less, the following defects can be prevented from occurring to the inner surface of the concave portion 30. The previously described defects are shine, discoloration and tearing. The same applies to the back face of the decorative sheet 10. By setting the pressing force of the base material 20 to 2000 N/cm or less, the embossing receiving die 80 can be suppressed from being deformed by the heat from the embossing die 60.

Effect of Embodiment

According to the embodiment, the following effects can be obtained.

(1) In the decorative sheet 10, the concave portion 30 is provided on the front face of the base material 20 (see FIG. 1). The concave portion 30 includes the bottom surface 32. The bottom surface 32 includes the first surface A, the second surface B, the third surface C, the fourth surface D, the fifth surface E, the sixth surface F, the seventh surface G, the eighth surface H, the ninth surface I, the tenth surface J and the eleventh surface K (see FIG. 3). In the bottom surface 32, the third surface C is connected to the first surface A and the second surface B, the fifth surface E is connected to the second surface B and the fourth surface D, the seventh surface G is connected to the fourth surface D and the sixth surface F, the ninth surface I is connected to the sixth surface F and the eighth surface H, and the eleventh surface K is connected to the eighth surface H and the tenth surface J. In the bottom surface 32, the depth dimensions of the first surface A, the second surface B, the fourth surface D, the sixth surface F, the eighth surface H and the tenth surface J gradually decrease, and is set to become "A>B>D>F>H>J". Therefore, the bottom surface 32 can be become a stair-like shaped surface. The decorative sheet 10 can be made to have an excellent design.

(2) In the bottom surface 32, the first surface A, the second surface B, the fourth surface D, the sixth surface F, the eighth surface H and the tenth surface J are surfaces along the front face of the base material 20, and the third surface C, the fifth surface E, the seventh surface G, the ninth surface I and the eleventh surface K are surfaces along the thickness direction (see FIG. 3). The step dimensions of the third surface C, the fifth surface E, the seventh surface G, the ninth surface I and the eleventh surface K are set to the same value. Therefore, the bottom surface 32 can be inclined at a constant angle θ.

(3) The embossing apparatus 50 includes the embossing die 60, the embossing receiving die 80 and the heating units 90 (see FIG. 4). The embossing apparatus 50 performs the embossing method. The embossing die 60 includes a convex shaped mold portion 70 (see FIGS. 4 and 5). The mold portion 70 corresponds to one concave portion 30 formed on the front face of the base material 20. When the embossing method is performed, the mold portion 70 contacts the front face of the base material 20. The mold portion 70 is an aggregate of protrusions P1, P2, P3, P4, P5 and P6 divided by the slits S1, S2, S3, S4 and S5 (see FIG. 5). The protrusion P1 is adjacent to the protrusion P2 through the slit S1. The protrusion P2 is adjacent to the protrusion P3 through the slit S2. The protrusion P3 is adjacent to the protrusion P4 through the slit S3. The protrusion P4 is adjacent to the protrusion P5 through the slit S4. The protrusion P5 is adjacent to the protrusion P6 through the slit S5. The height dimensions of the protrusions P1, P2, P3, P4, P5 and P6 are set to "P1>P2>P3>P4>P5>P6".

Therefore, the area of the mold portion 70 which contacts with the front face of the base material 20 can be reduced. In a state in which the embossing die 60 is heated by the heating units 90, the amount of heat applied from the mold portion 70 to the base material 20 can be reduced. The inner surface of the concave portion 30 can be a surface without shine. For example, when the embossing method is performed, the region that becomes the bottom surface 32 on the front face of the base material 20 is in contact with the top surfaces of the protrusions P1, P2, P3, P4, P5 and P6. Therefore, in the concave portion 30, occurrence of the shine on the bottom surface 32 is suppressed. A decorative sheet 10 having an excellent design can be manufactured.

<Modifications>

The embodiment can also be configured as follows. Some configurations of modifications illustrated below may also be employed in combination as appropriate. In the following description, points different from the above description are described, and the description of similar points is omitted as appropriate.

Figure 6:
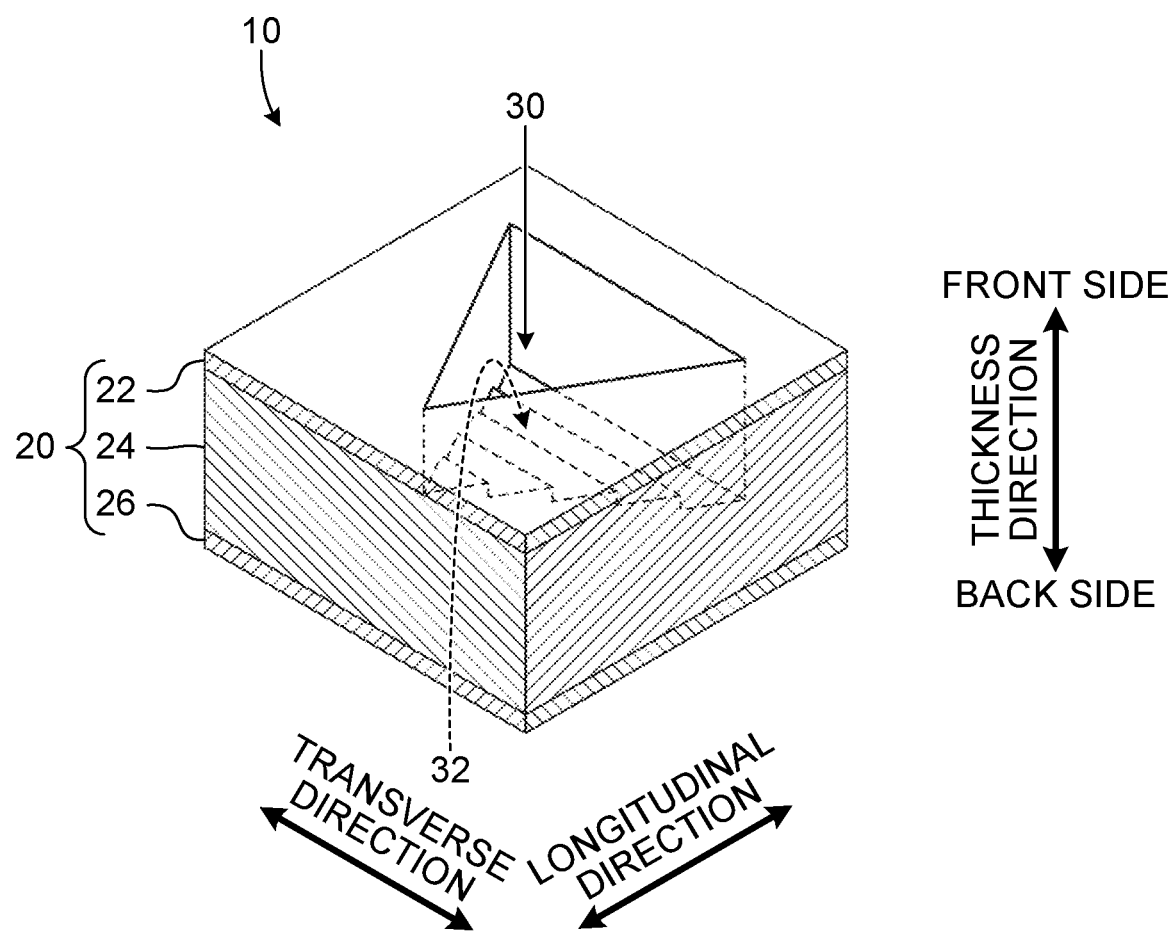
FIG. 6 is a perspective view which shows another example of the schematic configuration of the concave portion. A part of the decorative sheet is shown.
Figure 7:
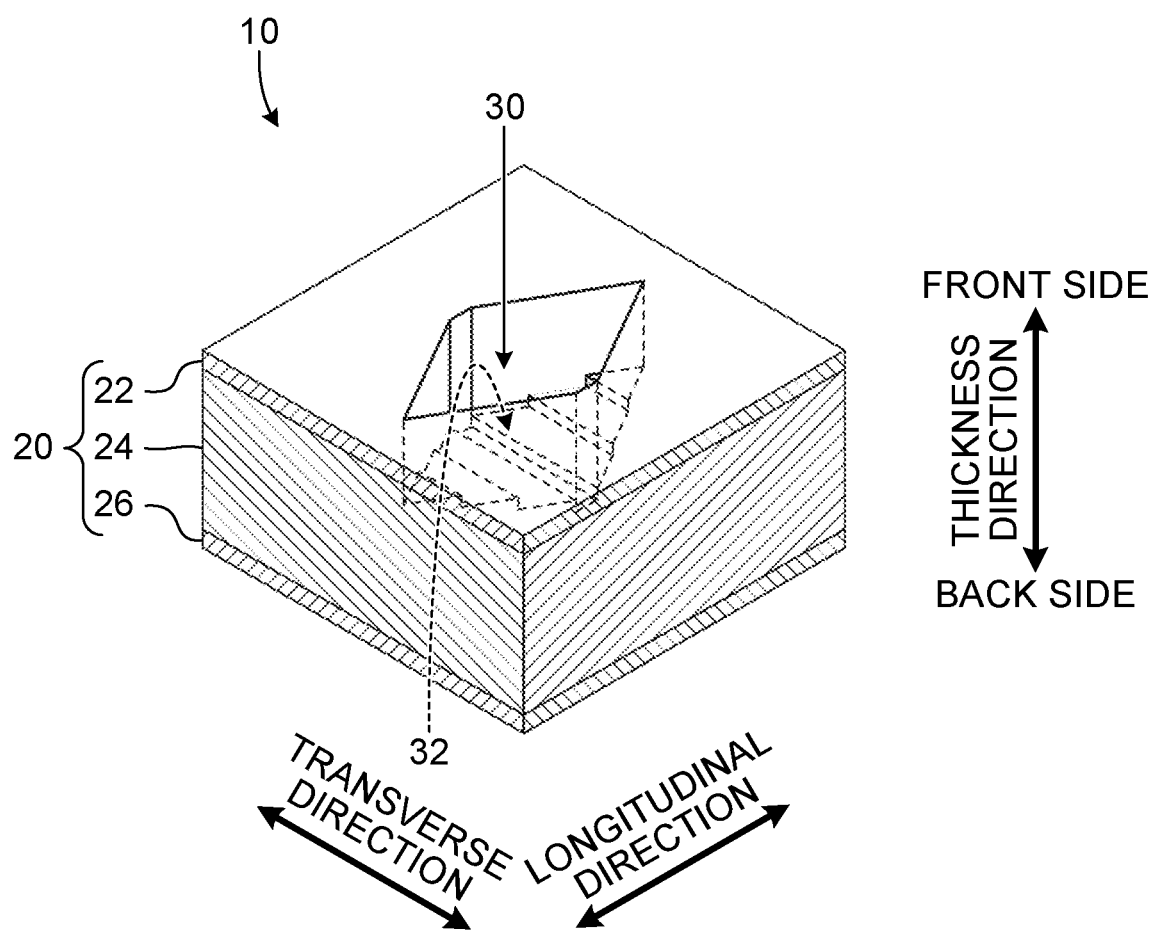
FIG. 7 is a perspective view which shows still another example of the schematic configuration of the concave portion. A part of the decorative sheet is shown.

(1) The concave portion 30 has a shape that crosses the base material 20 in the transverse direction and includes the bottom surface 32 (see FIG. 1). The bottom surface 32 has a stair-like shape that is inclined with respect to the front face of the base material 20 (see FIG. 3). The concave portion may be a concave portion having a shape different from the previously described shape as long as the aspect has the bottom surface inclined with respect to the front face of the base material. For example, the concave portion may be a concave portion which does not cross the base material in the transverse direction. Examples of the concave portion which does not cross the base material in the transverse direction include a concave portion provided along the longitudinal direction of the base material and a concave portion which has an annular wall surface. Examples of the concave portion which has an annular wall surface include a concave portion whose planar shape is a circular shape, an elliptical shape, a polygonal shape, a star shape and a flower shape when the decorative sheet 10 is viewed in plan. For example, the concave portion 30 of FIG. 6 is a concave portion whose planar shape is a triangle. The concave portion 30 of FIG. 7 is a concave portion whose planar shape is a rhombus shape. In the concave portion 30 of FIG. 7, the following both sides have a shape along the length direction. The both sides previously described are both sides in the width direction of the central region in the length direction. Therefore, the planar shape of the concave portion 30 of FIG. 7 is not a perfect rhombus. In FIGS. 6 and 7, in order to clarify the correspondence with FIGS. 1 and 3, the reference numerals for the respective portions are the same as those mentioned above.

In the concave portion 30 of FIG. 3, the bottom surface 32 is a stair-like surface having six steps and includes the first surface A to the eleventh surface K. The first surface A, the second surface B, the fourth surface D, the sixth surface F, the eighth surface H and the tenth surface J are surfaces along the front face of the base material 20, and the third surface C, the fifth surface E, the seventh surface G, the ninth surface I and the eleventh surface K are surfaces whose step dimensions are set to the same value. For example, it is assumed that the bottom surface is a six stepped stair-like surface as the bottom surface 32. In this case, some or all of the six surfaces corresponding to the first surface A, the second surface B, the fourth surface D, the sixth surface F, the eighth surface H and the tenth surface J may be inclined with respect to the front face of the base material. Some or all of the five surfaces corresponding to the third surface C, the fifth surface E, the seventh surface G, the ninth surface I, and the eleventh surface K may be surfaces having different step dimensions.

As the first surface A to the eleventh surface K of the bottom surface 32, some or all of the surfaces forming the steps of the bottom surface may be uneven surfaces. In addition, the bottom surface may be a surface having a predetermined number of steps of 2 to 5 or a surface having a predetermined number of steps of 6 or more. For example, the concave portion 30 of FIG. 6 is a stair-like surface with the bottom surface 32 having five steps, and the concave portion 30 of FIG. 7 is a stair-like surface with the bottom surface 32 having seven steps. In the concave portion 30 of FIG. 7, the bottom surface 32 has a shape inclined toward two vertexes with the central region in the length direction as a boundary.

In the concave portion 30 of FIGS. 1, 3 and FIGS. 6, 7, a wall surface has a shape along the height direction. The wall surface of the concave portion may be a surface inclined with respect to the front face of the base material, bottom surface and the height direction. The shape of the wall surface of the concave portion is appropriately determined in consideration of various conditions. For example, in determining the shape of the wall surface of the concave portion, the design required for the decorative sheet is considered. In the concave portion 30 of FIGS. 1, 3 and FIGS. 6, 7, the opening end has the same shape as the bottom surface 32. The opening end of the concave portion may have a shape different from the bottom surface. Different shapes include similar shapes. The concave portion may be a concave portion in which the center of the bottom surface and the center of the opening end are shifted in a state in which the decorative sheet is viewed in plan. In the embossing die, the die portion has a shape corresponding to the shape of the concave portion.

(2) The mold portion 70 has a shape corresponding to the concave portion 30 (see FIGS. 1, 4 and 5). The mold portion 70 is divided by slits S1, S2, S3, S4 and S5, and includes protrusions P1, P2, P3, P4, P5 and P6 that are adjacent to each other through the slit S (see FIG. 5). The slits S1, S2, S3, S4 and S5 are provided along the width direction and are linear gaps having a constant gap dimension. The protrusions P1, P2, P3, P4, P5 and P6 include a rectangular planar top surface having a long side and a short side.

Figure 8:
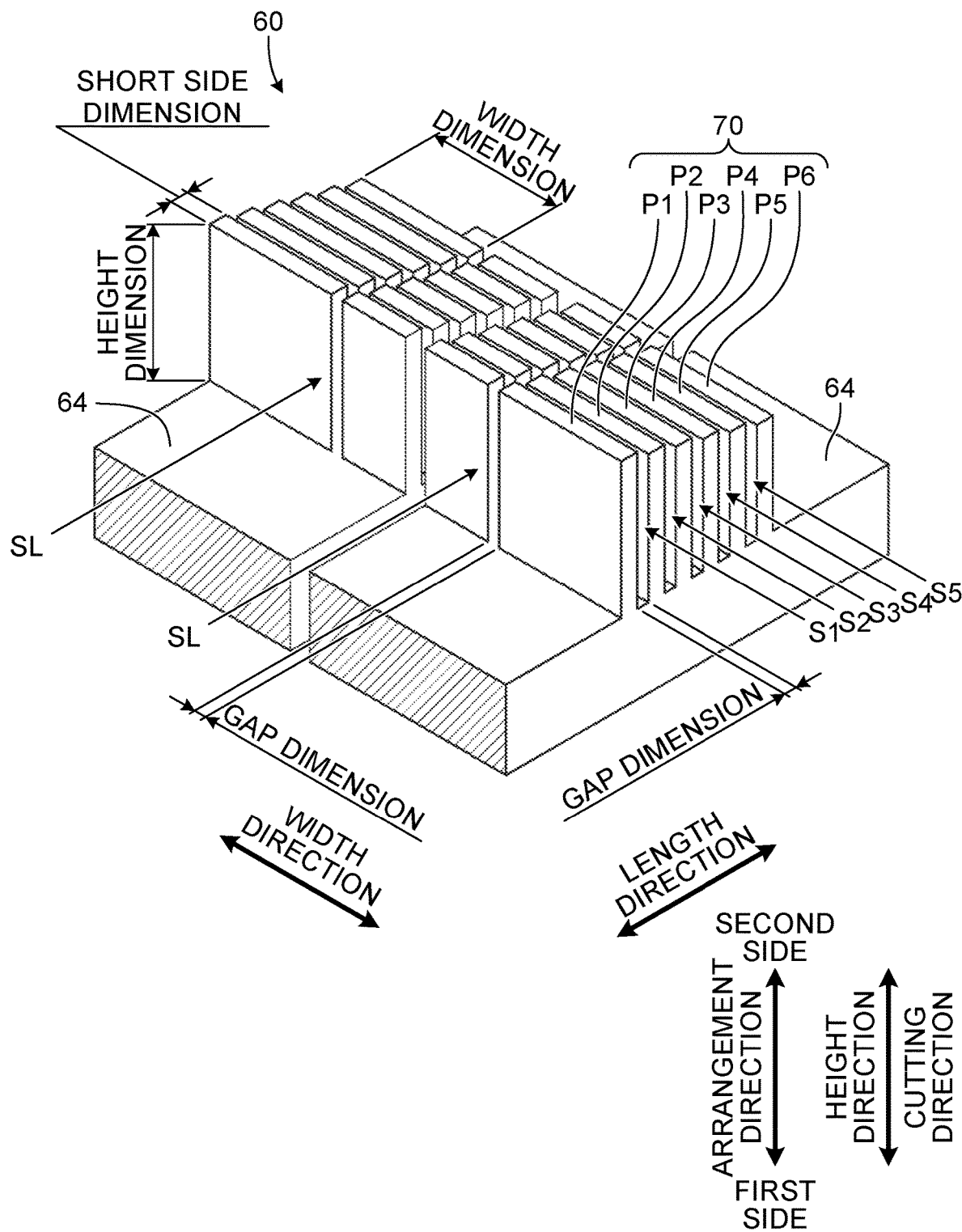
FIG. 8 is a perspective view which shows another example of the schematic configuration of the mold portion. The mold portion in which slits are provided along the width direction and a length direction is shown. A part of the embossing die is shown with a part omitted in the width direction.

In the mold portion 70, the slit S may be provided along the length direction, or may be provided in a grid-like shape along both the width direction and the length direction (see FIG. 8). In FIG. 8, in order to clarify the correspondence with FIG. 5, the reference numerals for the respective portions are the same as described above. However, in FIG. 8, the slit along the length direction is referred to as "slit SL", and is distinguished from the slits S1, S2, S3, S4 and S5. In this case, the slit S corresponds to a part of the slits S1, S2, S3, S4, S5 and the slit SL, or collectively refers to them. In the mold portion 70 of FIG. 8, the protrusions P1, P2, P3, P4, P5 and P6 are divided in the width direction by the slits SL which are provided along the length direction.

The slits SL may be provided at predetermined positions in the width direction where the width dimensions of the following portions are the same or may be provided at predetermined positions in the width direction from which the width dimensions of the following portions differ. The previously descripted portions are a plurality of portions of one protrusion P divided by the slits SL. The positions in the width direction where the slits SL are provided are appropriately determined in consideration of various conditions. The number of slits SL is appropriately determined in consideration of various conditions. The gap dimension of the slits SL may be the same value as the gap dimension of the slits S1, S2, S3, S4 and S5 or may be different value from the gap dimension of slits S1, S2, S3, S4 and S5. The gap dimension of the slits SL coincides with the interval between two portions adjacent to each other in the width direction among the plurality of portions of one protrusion P divided by the slits SL.

The slit may not be a linear gap having a constant gap dimension. In other words, the top surface of the protrusion may not be a rectangle having a long side and a short side. For example, the top surface of the protrusion may have a zigzag shape, a rectangular wave shape or a sine wave shape (wave line). The top surface of the protrusion may be circular, elliptical, polygonal (except for a quadrangle), a star shape or a flower shape. The top surface of the protrusion may have any irregular shape. In this case, the slit becomes a gap corresponding to the shape of the top surface of the protrusion. The shape of the protrusion may be square. In this case, the slit becomes a linear gap having a constant gap dimension as mentioned above. In addition, the mold portion may have a shape that does not include the slit S. In this case, the mold portion has the following shape. The shape previously described is an integral convex shape. Furthermore, the shape previously described is a stair-like shape having a predetermined number of steps with two or more top surfaces.

(3) In the decorative sheet 10, the concave portion 30 which has the following shape was illustrated (see FIGS. 1 and 3). The shape previously described is a shape that crosses the base material 20 in the transvers direction. Furthermore, the shape previously described is a stair-like shape having six steps in which the bottom surface 32 is inclined at an angle θ with respect to the front face of the base material 20. In the decorative sheet, various concave portions are required in terms of design.

When the concave portion 30 of FIG. 6 is provided in the decorative sheet 10, the mold portion may be, for example, the mold portion 70 of FIG. 9. In FIG. 9, in order to clarify the correspondence with FIG. 5, the reference numerals for the respective portions are the same as those mentioned above. The mold portion 70 of FIG. 9 includes five protrusions P1, P2, P3, P4 and P5 divided by four slits S1, S2, S3 and S4. The top surfaces of the protrusions P1, P2, P3 and P4 have a trapezoidal planar shape. The top surface of the protrusion P5 has a triangular planar shape. The width dimensions of the protrusions P gradually decreases in the order of the protrusion P1, the protrusion P2, the protrusion P3, the protrusion P4 and the protrusion P5, and is set to "P1>P2>P3>P4>P5". The width dimension of the protrusion P may be reduced at a constant rate or at a close rate to the constant rate.

In the mold portion 70 of FIG. 9, side dimensions of the protrusions P1, P2, P3, P4 and P5 are the same value. The side dimension corresponds to the short side dimension of the protrusion P in the mold portion 70 of FIG. 5. The mold portion 70 of FIG. 9 and FIG. 10 described later includes a protrusion P whose planar shape of the top surface has a non-rectangular shape. In the mold portion 70 of FIGS. 9 and 10, the dimension in the length direction of the protrusion P is referred to as "side dimension". The height dimensions of the protrusions P gradually decrease in the order of the protrusion P1, the protrusion P2, the protrusion P3, the protrusion P4 and the protrusion P5, and is set to "P1>P2>P3>P4>P5". The gap dimension of the slit S is better to be set to "S1=S2=S3=S4". In this regard, the mold portion 70 of FIG. 9 satisfies the previously described conditions.

When the decorative sheet 10 is provided with the concave portion 30 of FIG. 7, the mold portion is better to be, for example, the mold portion 70 of FIG. 10. In FIG. 10, in order to clarify the correspondence with FIG. 5, the reference numerals for the respective parts are the same as described above. The mold portion 70 of FIG. 10 includes seven protrusions P1, P2, P3, P4, P5, P6, and P7 divided by six slits S1, S2, S3, S4, S5 and S6. The top surfaces of the protrusions P1 and P7 have a triangular planar shape. The top surfaces of the protrusions P2, P3, P5 and P6 have a trapezoidal planar shape. The top surface of the protrusion P4 has a rectangular planar shape. The protrusion P1 has a linearly symmetrical shape with the protrusion P7 with respect to the protrusion P4. The protrusion P2 has a linearly symmetrical shape with the protrusion P6 with respect to the protrusion P4. The protrusion P3 has a linearly symmetrical shape with the protrusion P5 with respect to the protrusion P4. The width dimensions of the protrusions P gradually decrease in the order of the protrusion P4, the protrusion P3, the protrusion P2 and the protrusion P1, and gradually decreases in the order of the protrusion P4, the protrusion P5, the protrusion P6 and the protrusion P7, and is set to "P4>P3=P5>P2=P6>P1=P7". The width dimension of the protrusion P may be reduced at a constant rate or at a close rate to the constant rate.

In the mold portion 70 of FIG. 10, the side dimensions of the protrusions P1, P2, P3, P4, P5, P6, and P7 are the same value. The height dimensions of the protrusions P gradually decrease in the order of the protrusion P4, the protrusion P3, the protrusion P2 and the protrusion P1, and gradually decreases in the order of the protrusion P4, the protrusion P5, the protrusion P6 and the protrusion P7, and is set to "P4>P3=P5>P2=P6>P1=P7". The gap dimension of the slit S is better to be set to "S1=S2=S3=S4=S5=S6". In this regard, the mold portion 70 of FIG. 10 satisfies the previously described conditions.

In FIGS. 6 and 7, for convenience of explanation, the longitudinal direction and the transverse direction are set as shown in FIGS. 6 and 7, and in FIGS. 9 and 10, the length direction corresponds to the longitudinal direction, and the width direction corresponds to the transverse direction. In the decorative sheet 10 including the concave portion 30 in FIGS. 6 and 7, the directions of the longitudinal direction and the transverse direction may be different from those in FIGS. 6 and 7. For example, in FIGS. 6 and 7, the direction set as the transverse direction may be set as the longitudinal direction, and the direction set as the longitudinal direction may be set as the transverse direction. In this case, in FIGS. 9 and 10, the direction set as the width direction becomes the length direction, and the direction set as the length direction becomes the width direction.

(4) In the embossing apparatus 50, the relative movement of the embossing die 60 and the embossing receiving die 80 is performed by reciprocating the embossing die 60 in the arrangement direction with the position of the embossing receiving die 80 fixed (see FIG. 4). The relative movement between the embossing die 60 and the embossing receiving die 80 may be different from this. For example, the relative movement of the embossing die 60 and the embossing receiving die 80 may be performed by reciprocating both the embossing die 60 and the embossing receiving die 80 in the arrangement direction.

(5) In the embossing apparatus 50, the embossing die 60 and the embossing receiving die 80 have a flat plate shape (see FIGS. 4 and 5). The embossing die and the embossing receiving die may have a shape different from the flat plate shape. For example, the embossing die 60 and the embossing receiving die 80 may have a roll shape as shown in FIGS. 11 and 12. In this case, the embossing die 60 may be referred to as an embossing roll, and the embossing receiving die 80 may be referred to as a receiving roll or a backup roll. In FIGS. 11 and 12, in order to clarify the correspondence with FIGS. 4 and 5, the reference numerals for the respective portions are the same as those mentioned above. In FIG. 11, as in FIG. 4, the illustrations of the supply device 95 and the recovery device 96 are simplified.

In the embossing apparatus 50 of FIG. 11, the embossing die 60 and the embossing receiving die 80 are provided side by side in the arrangement direction. The embossing die 60 is provided on the first side in the arrangement direction. The embossing receiving die 80 is provided on the second side in the arrangement direction. As in the embossing apparatus 50 of FIG. 4, the arrangement direction is the vertical direction, and the conveying direction is the horizontal direction. The width direction of the embossing die 60 and the width direction of the embossing receiving die 80 coincide with the transverse direction. A shaft 62 of the embossing die 60 and a shaft 82 of the embossing receiving die 80 are in a parallel state.

The embossing die 60 rotates in a direction corresponding to the conveying direction with the shaft 62 as a rotation axis. A driving force is given to the embossing die 60 from a driving unit. The drive unit is attached to the shaft 62. Along with this, the embossing die 60 rotates as previously described. In FIGS. 11 and 12, the illustration of the drive unit is omitted. An example of the drive unit includes a motor. The following arrow shown in FIG. 11 indicates a rotation direction of the embossing die 60. The previously described arrow is a single arrow shown inside the embossing die 60.

A plurality of mold portions 70 are provided at equiangular intervals on an outer peripheral surface of the roll-shaped embossing die 60. The plurality of mold portions 70 are arranged corresponding to the interval W in a circumferential direction. In the embossing die 60, the circumferential direction is a circumferential direction around the shaft 62. The circumferential direction coincides with the rotational direction of the embossing die 60 and the opposite direction thereof. The circumferential direction corresponds to the longitudinal direction.

In the mold portion 70, a plurality of protrusions P are provided along a radial direction of the embossing die 60. In this case, the gap dimension of the slit S may be defined as a maximum circumferential interval between adjacent protrusions P (see FIG. 12). The top surface of the protrusion P has an arc shape that is concentric with the base surface 64. In the roll-shaped embossing die 60, the base surface 64 is the outer peripheral surface of the embossing die 60, and can be said that it is a region on a bottom side between two convex mold portions 70 adjacent in the circumferential direction. When the radial direction of the embossing die 60 having a roll shape is used as a reference, the previously described bottom side is the center side (the side of the shaft 62).

The embossing receiving die 80 rotates in a direction corresponding to the conveying direction with the shaft 82 as a rotation axis. A rotation direction of the embossing receiving die 80 is opposite to the rotation direction of the embossing die 60. The embossing receiving die 80 is in contact with the back face of the base material 20. In the embossing apparatus 50, the embossing die 60 sandwiches the base material 20 together with the embossing receiving die 80. The embossing receiving die 80 is rotated in accordance with the rotation of the embossing die 60 while being in contact with the back face of the base material 20. The following arrow shown in FIG. 11 indicates the rotation direction of the embossing receiving die 80. The previously described arrow is a single arrow shown inside the embossing receiving die 80.

Prior to performing of the embossing method, the embossing apparatus 50 of FIG. 11 is adjusted so that the following position is the following fourth state, as in the first state in the embossing apparatus 50 of FIG. 4. The previously described position is a position in the arrangement direction of the embossing die 60 with respect to the front face of the base material 20. The fourth state is a state in which the base surface 64 does not contact the front face of the base material 20 when the base material 20 passes between the embossing die 60 and the embossing receiving die 80.

The embossing apparatus 50 of FIG. 11 may be the following fifth state and sixth state which are similar to the second state and third state in the embossing apparatus 50 of FIG. 4. The fifth state is a state in which the mold portion 70 bites into the elastic portion 84 (see "mold portion 70" shown on the second side in the arrangement direction in FIG. 11). The sixth state is a state in which the following dimension is larger than the thickness of the base material 20. The previously described dimension is a dimension in the arrangement direction between the base surface 64 and an outer peripheral surface of the embossing receiving die 80.

In the embossing step, the base material 20 conveyed in the conveying direction passes between the embossing die 60 and the embossing receiving die 80 in during conveyance. At this time, the base material 20 is in contact with the elastic portion 84 on the back face and is supported by the embossing receiving die 80 from the back side. The base material 20 is in contact with the mold portion 70 on the front face and is pressed by the mold portion 70. The base material 20 is heated by the heat from the embossing die 60 heated by heating units 90. The mold portion 70 bites into the base material 20. The base material 20 is formed into the decorative sheet 10 by the embossing step (see FIGS. 2 and 1). In the embossing step, the base material 20 passes between the embossing die 60 and the embossing receiving die 80 without making the front face contacting the base surface 64.

In FIG. 11, the illustrations of the following parts are simplified. The previously described part is a part of the base material 20 that is supported by the embossing receiving die 80. Furthermore, the previously described part is a part of the elastic portion 84 that supports the previously described part of the base material 20. That is, in FIG. 11, a part of the previously described part of the base material 20 is omitted, and is not illustrated in a concave shape corresponding to the mold portion 70. The previously described part of the elastic portion 84 is not illustrated in a state where elastic deformation has occurred.

In the embossing method performed by the embossing apparatus 50 of FIG. 11, a conveyance speed of the base material 20 may be set as follows, and in the embossing step of this embossing method, a pressing time of the base material 20 and a pressing force of the base material 20 may be set as follows.

The conveyance speed of the base material 20 is better to be set to a predetermined value in the range of 0.1 to 10 m/min. Preferably, the conveyance speed of the base material 20 is set to a predetermined value in the range of 0.3 to 5 m/min. By setting the conveyance speed of the base material 20 to 0.1 m/min or more, the following defects can be prevented from occurring to the inner surface of the concave portion 30. The previously described defects are shine, discoloration and tearing. The same applies to the back face of the decorative sheet 10. By setting the conveyance speed of the base material 20 to 0.1 m/min or more, the embossing receiving die 80 can be suppressed from being deformed by the heat from the embossing die 60. By setting the conveyance speed of the base material 20 to 10 m/min or less, when the base material 20 passes between the embossing die 60 and the embossing receiving die 80, the pressing force can be appropriately applied to the base material 20. A sufficient concave portion 30 can be formed on the front face of the base material 20.

The pressing time of the base material 20 is better to be set to a predetermined value in the range of 0.01 to 5 seconds. Preferably, the pressing time of the base material 20 is set to a predetermined value in the range of 0.1 to 2 seconds. The pressing time of the base material 20 is appropriately set in consideration of the shape of the mold portion 70. By setting the pressing time of the base material 20 to 0.01 seconds or more, when the base material 20 passes between the embossing die 60 and the embossing receiving die 80, the pressing force can be appropriately applied to the base material 20. A sufficient concave portion 30 can be formed on the front face of the base material 20. By setting the pressing time of the base material 20 to 5 seconds or less, the following defects can be prevented from occurring to the inner surface of the concave portion 30. The previously described defects are shine, discoloration and tearing. The same applies to the back face of the decorative sheet 10. By setting the pressing time of the base material 20 to 5 seconds or less, the embossing receiving die 80 can be suppressed from being deformed by the heat from the embossing die 60.

The pressing force of the base material 20 is better to be set to a predetermined value in the range of 200 to 2000 N/cm. By setting the pressing force of the base material 20 to 200 N/cm or more, when the base material 20 passes between the embossing die 60 and the embossing receiving die 80, the pressing force can be appropriately applied to the base material 20. A sufficient concave portion 30 can be formed on the front face of the base material 20. By setting the pressing force of the base material 20 to 2000 N/cm or less, the following defects can be prevented from occurring to the inner surface of the concave portion 30. The previously described defects are shine, discoloration and tearing. The same applies to the back face of the decorative sheet 10. By setting the pressing force of the base material 20 to 2000

N/cm or less, the embossing receiving die 80 can be suppressed from being deformed by the heat from the embossing die 60.

In the embossing apparatus, the embossing die and the embossing receiving die may be, for example, as follows. That is, the embossing apparatus may include the roll-shaped embossing die 60 (see FIGS. 11 and 12) and the flat-plate embossing receiving die 80 (see FIG. 3).

(6) The embossing receiving die 80 includes the elastic portion 84 and the main body portion 86 (see FIGS. 4 and 11). In the embossing receiving die, the main body 86 may be omitted. For example, the embossing receiving die may be made of resin that does not include the main body portion 86. In the roll-shaped embossing receiving die, the shaft may be made of resin. In the embossing receiving die, the elastic portion 84 may be omitted. For example, the embossing receiving die may be made of metal that does not include the elastic portion 84.

What is claimed is:

1. A decorative sheet forming a skin material for a product or part, the decorative sheet comprising:
    a base material having a concave portion on a front face, wherein the concave portion includes a bottom surface, a first wall surface at a first end of the bottom surface, and a second wall surface at a second end of the bottom surface opposite the first end, wherein the bottom surface includes:
        a first surface whose depth dimension which is a dimension from the front face of the base material along a thickness direction of the base material is a first value;
        a second surface whose depth dimension is a second value which is smaller than the first value; and
        a third surface which is connected with the first surface at a back side of the thickness direction, and is connected with the second surface at a front side of the thickness direction, the third surface having a third length extending in the thickness direction,
    wherein the first wall surface has a first length in the thickness direction and the second wall surface has a second length in the thickness direction, the first length and the second length both being greater than the third length of the third surface.

2. The decorative sheet according to claim 1, the bottom surface further comprising:
    a fourth surface whose depth dimension is a third value which is smaller than the second value; and
    a fifth surface which is connected with the second surface at the back side of the thickness direction, and is connected with the fourth surface at the front side of the thickness direction,
    wherein the first surface, the second surface and the fourth surface are surfaces which are along the front face of the base material,
    wherein the fifth surface is a surface having a step dimension, and the step dimension is a dimension which is along the thickness direction of the fifth surface, and the step dimension of the fifth surface has an identical value as the step dimension of the third surface.

* * * * *